US010651536B2

United States Patent
Nakano

(10) Patent No.: US 10,651,536 B2
(45) Date of Patent: May 12, 2020

(54) WINDOW GLASS FOR VEHICLE

(71) Applicant: AGC INC., Tokyo (JP)

(72) Inventor: Kazuhiro Nakano, Tokyo (JP)

(73) Assignee: AGC INC., Tokyo (JP)

( * ) Notice: Subject to any disclaimer, the term of this patent is extended or adjusted under 35 U.S.C. 154(b) by 35 days.

(21) Appl. No.: 15/894,660

(22) Filed: Feb. 12, 2018

(65) Prior Publication Data

US 2018/0233803 A1    Aug. 16, 2018

(30) Foreign Application Priority Data

Feb. 14, 2017  (JP) .................. 2017-025268

(51) Int. Cl.
| | |
|---|---|
| *H01Q 1/32* | (2006.01) |
| *H01Q 1/12* | (2006.01) |
| *B60J 1/00* | (2006.01) |
| *B60J 1/20* | (2006.01) |
| *H05B 3/86* | (2006.01) |
| *E06B 7/28* | (2006.01) |

(52) U.S. Cl.
CPC ............ *H01Q 1/1278* (2013.01); *B60J 1/002* (2013.01); *B60J 1/20* (2013.01); *H05B 3/86* (2013.01); *E06B 7/28* (2013.01); *H01Q 1/3241* (2013.01)

(58) Field of Classification Search
CPC ........... H01Q 1/1278; H01Q 1/32; H05B 3/86
USPC ......................................................... 343/713
See application file for complete search history.

(56) References Cited

U.S. PATENT DOCUMENTS

| | | | | |
|---|---|---|---|---|
| 5,659,324 A | * | 8/1997 | Taniguchi ............ | H01Q 1/1278 343/704 |
| 5,663,737 A | * | 9/1997 | Kakizawa ............ | H01Q 1/1271 343/704 |
| 5,986,612 A | * | 11/1999 | Nagy ................... | H01Q 1/1271 343/713 |
| 6,008,767 A | * | 12/1999 | Taniguchi ............ | H01Q 1/1271 343/713 |

(Continued)

FOREIGN PATENT DOCUMENTS

| | | |
|---|---|---|
| EP | 1 841 007 A1 | 10/2007 |
| EP | 2 051 326 A1 | 4/2009 |

(Continued)

OTHER PUBLICATIONS

European Office Action issued on Application No. 18156263.8, dated Sep. 2, 2019.

*Primary Examiner* — Huedung X Mancuso
(74) *Attorney, Agent, or Firm* — Foley & Lardner LLP

(57) ABSTRACT

A vehicle window glass includes a glass including a transparent area and a shading area around the transparent area; a defogger including wires placed at equal first intervals extended in a direction, and a defogger element connected to the wires; and a glass antenna including a power feeding point in the shading area, and a first element connected to the power feeding point. The defogger element includes a first part in the transparent area and extended in the direction, and a second part in the shading area and connected to the first part. The first element includes a third part in the transparent area extended in the direction, and a fourth part in the shading area and connected to the third part and the power feeding point. A part of the second part and a part of the fourth part are placed to have a narrower interval.

11 Claims, 16 Drawing Sheets

(56) References Cited

U.S. PATENT DOCUMENTS

| | | | | |
|---|---|---|---|---|
| 6,919,848 | B2* | 7/2005 | Ishibayashi | H01Q 1/1271 343/711 |
| 7,511,676 | B2* | 3/2009 | Noda | H01Q 1/1271 343/704 |
| 9,985,333 | B2* | 5/2018 | Takeuchi | H01Q 1/1271 |

FOREIGN PATENT DOCUMENTS

| | | |
|---|---|---|
| EP | 2 173 008 A1 | 4/2010 |
| EP | 2 207 239 A1 | 7/2010 |
| EP | 2 458 672 A1 | 5/2012 |
| EP | 2 581 983 | 4/2013 |
| EP | 3101733 A1 | 12/2016 |
| EP | 3101734 A1 | 12/2016 |
| JP | 2015-142162 A | 8/2015 |
| JP | 2015-142246 A | 8/2015 |

\* cited by examiner

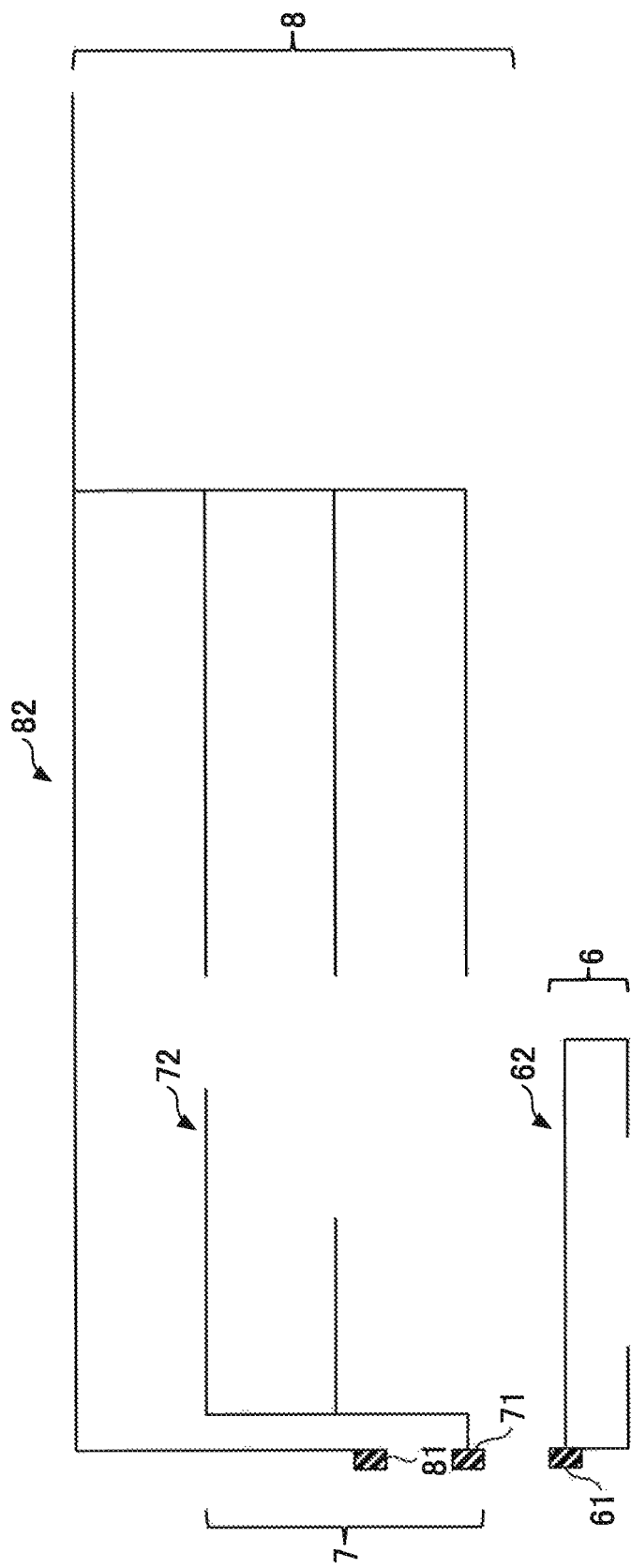

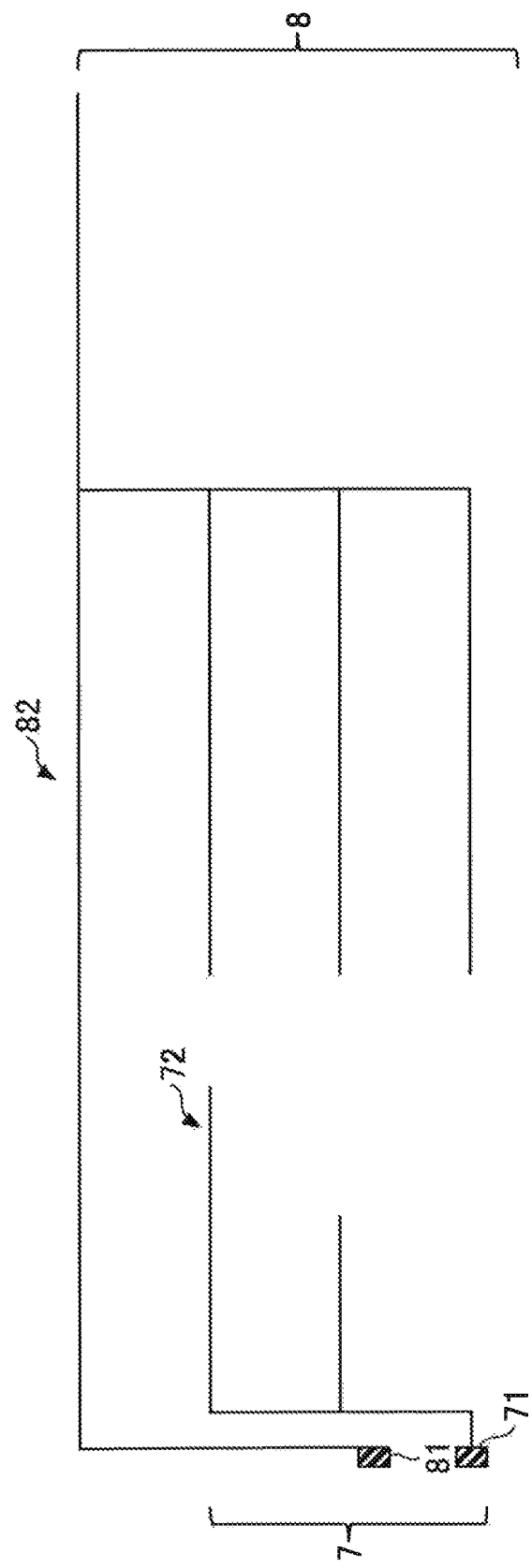

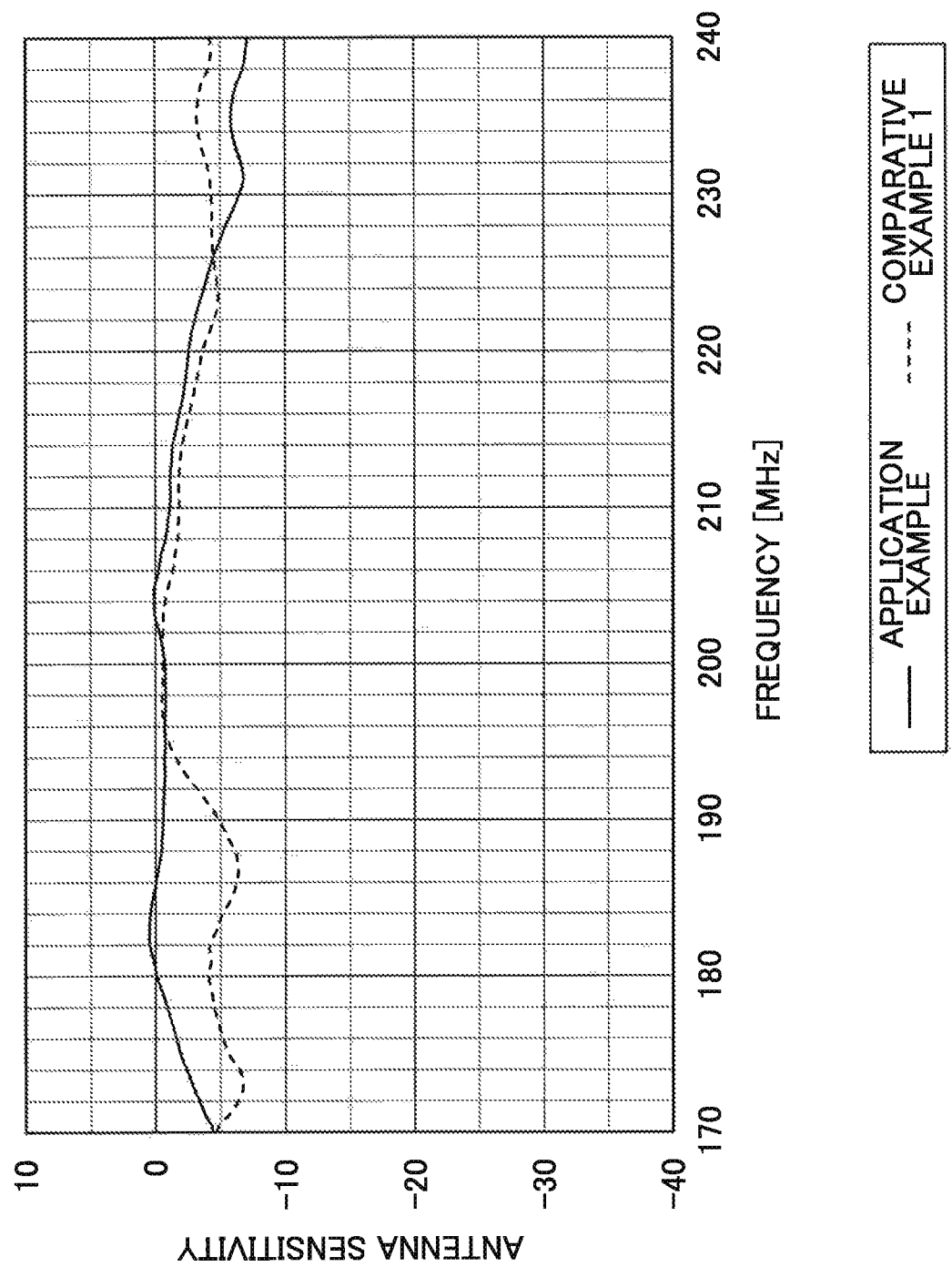

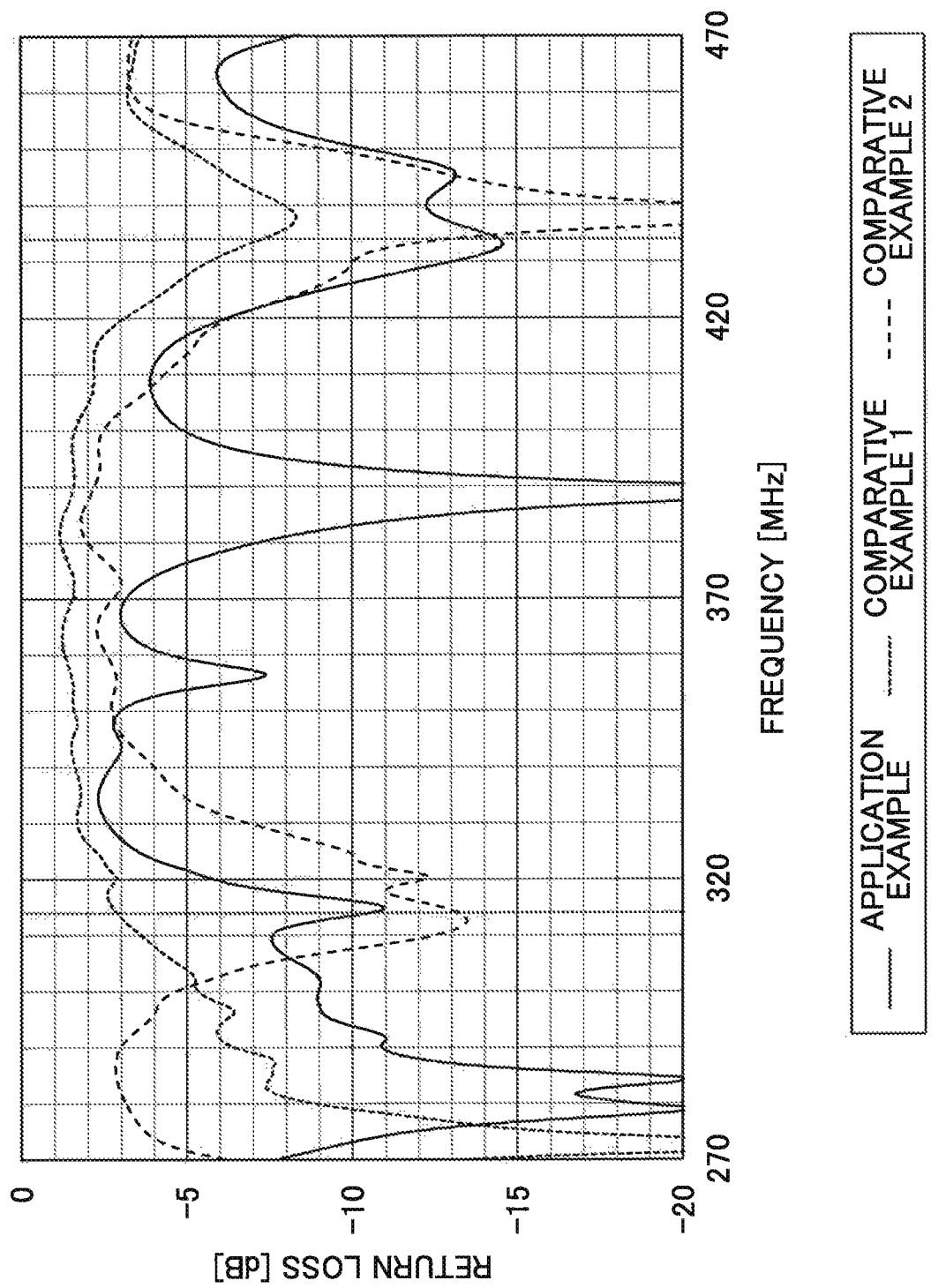

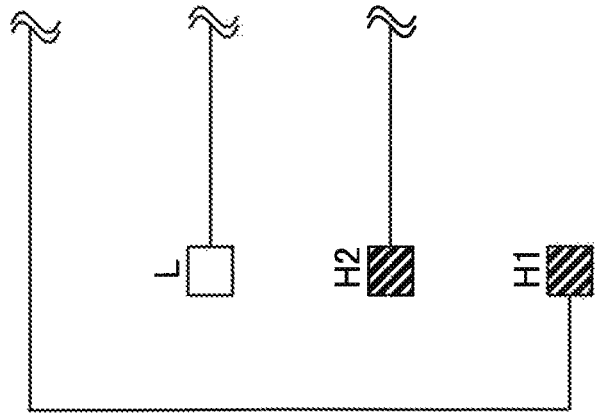
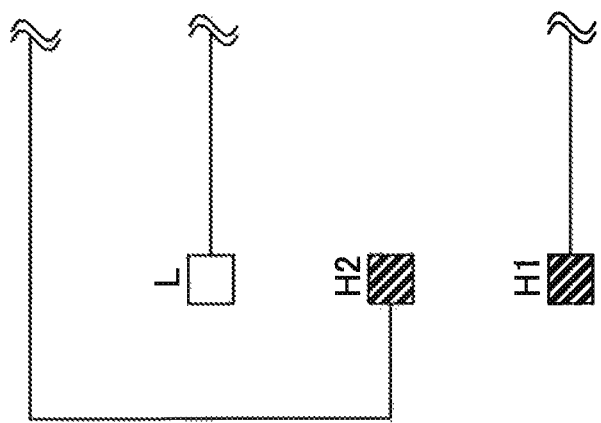
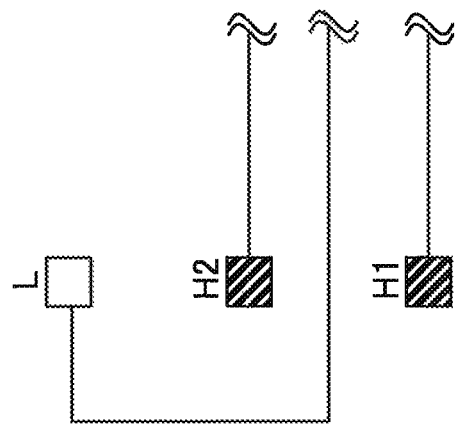

WINDOW GLASS FOR VEHICLE

CROSS-REFERENCE TO RELATED APPLICATION

This application is based upon and claims the benefit of priority of the prior Japanese Priority Application No. 2017-025268 filed on Feb. 14, 2017, the entire contents of which are hereby incorporated by reference.

BACKGROUND OF THE INVENTION

1. Field of the Invention

The present disclosure relates to a window glass for a vehicle.

2. Description of the Related Art

In recent years, a window glass for a vehicle has multiple glass antennas installed, including an AM antenna, a digital audio broadcasting (DAB) antenna, and a remote keyless entry (RKE) antenna. As a conventional method to raise the antenna sensitivity of a glass antenna, a method has been proposed that places a part of an element placed on a transparent area of the window glass for the vehicle, close to the defogger (see, for example, Japanese Unexamined Patent Application Publication No. 2015-142162 and No. 2015-142246).

However, the above conventional method has a problem that the part of the element placed close to the defogger is noticeable, and hence, reduces the designability of the window glass for the vehicle.

SUMMARY OF THE INVENTION

According to an embodiment, a window glass for a vehicle includes the window glass that includes a transparent area and a shading area provided around the transparent area; a defogger that includes a plurality of first wires placed at equal intervals each being a first interval and extended in a first direction, and a defogger element connected to the first wires; and a glass antenna that includes a first power feeding point provided in the shading area, and a first element connected to the first power feeding point. The defogger element includes a first part that is provided in the transparent area and is extended in the first direction, and a second part that is provided in the shading area and is connected to the first part. The first element includes a third part that is provided in the transparent area and is extended in the first direction, and a fourth part that is provided in the shading area and is connected to the third part and the first power feeding point. A part of the second part and a part of the fourth part are placed at an interval narrower than the first interval.

According to an embodiment in the present disclosure, it is possible to raise the antenna sensitivity of a glass antenna, and to prevent the designability of the window glass for a vehicle from reducing.

Other objects, features and advantages of the present invention will become more apparent from the following detailed description when read in conjunction with the accompanying drawings.

BRIEF DESCRIPTION OF THE DRAWINGS

FIG. 3 is a diagram illustrating a comparative example 1 of a glass antenna;

FIG. 4 is a diagram illustrating a comparative example 2 of a glass antenna;

FIG. 5 is a graph illustrating an experimental result of antenna sensitivity;

FIG. 6 is a graph illustrating an experimental result of return loss;

FIGS. 7A to 7C are diagrams schematically illustrating variations of glass antennas;

DESCRIPTION OF THE PREFERRED EMBODIMENTS

In the following, embodiments will be described with reference to the drawings. Note that the same reference symbol is attached to components having substantially the same function and/or configuration in the specification and the drawings so as to omit duplicate description.

First Embodiment

A window glass for a vehicle according to a first embodiment will be described with reference to FIG. 1 to FIG. 7. In the following, a case in which a window glass for a vehicle is a rear glass attached to a rear part of the vehicle will be taken as an example. However, the window glass for the vehicle according to the embodiment may be a windshield attached to a front part of the vehicle, or may be a side glass attached to a side part of the vehicle.

Figure 1:
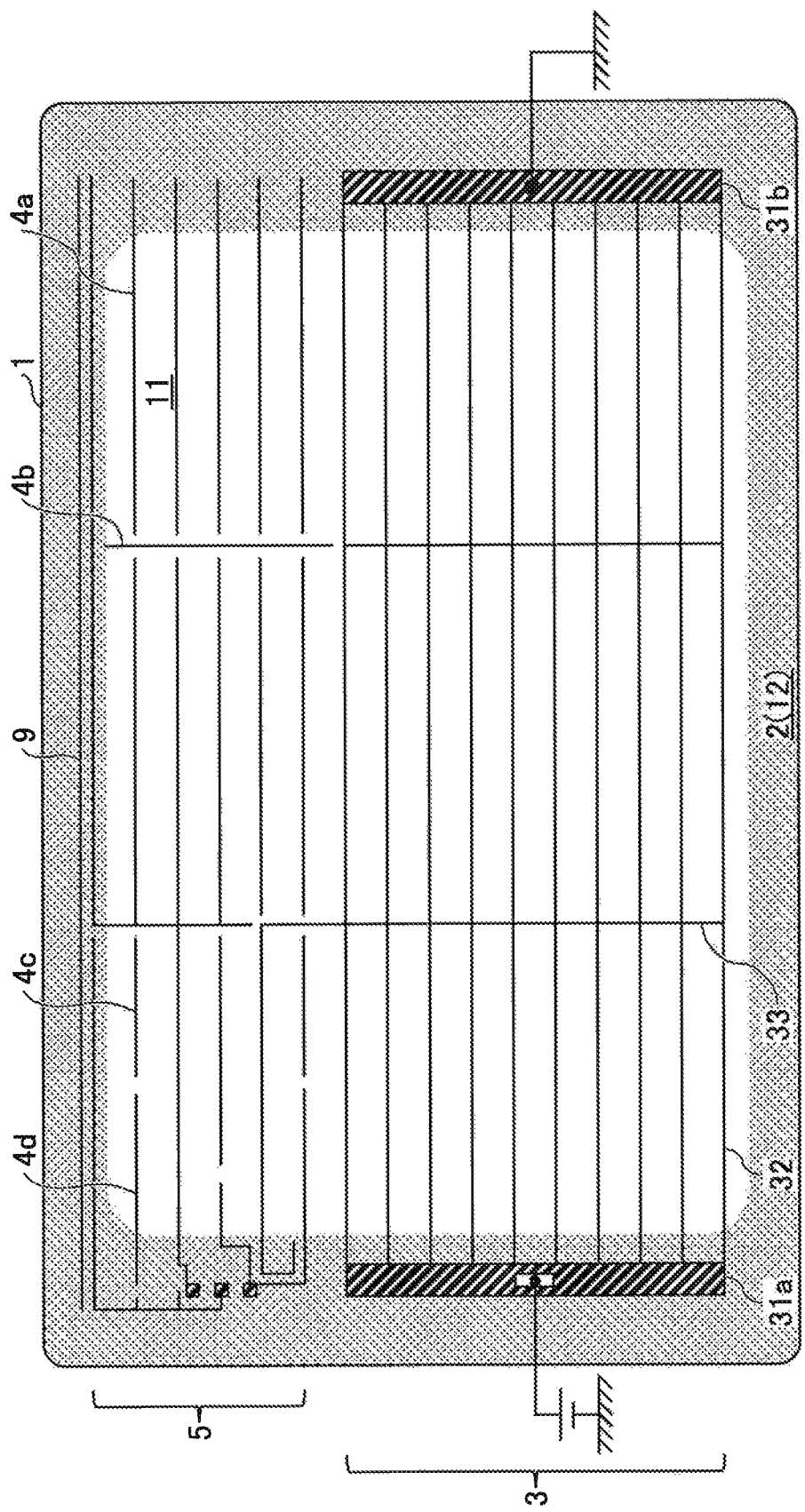
FIG. 1 is a front view illustrating an example of a window glass for a vehicle according to a first embodiment, viewed from the inside of the vehicle.

First, a configuration of the window glass for the vehicle according to the embodiment will be described. FIG. 1 is a front view illustrating an example of the window glass for the vehicle according to an embodiment, viewed from the inside of the vehicle. In the following, the up-down direction of a diagram will be referred to as the vertical direction (a second direction), and the right-left direction will be referred to as the horizontal direction (a first direction). The vertical direction corresponds to the vehicle height direction, and the horizontal direction corresponds to the vehicle width direction. Also, terms such as "parallel", "perpendicular", and "linear line" in the following description are assumed to include a deviation that is permissible as long as a relevant effect is not impaired.

The window glass for the vehicle in FIG. 1 includes the window glass 1, a shading film 2, a defogger 3, multiple no-power-fed wires 4, a glass antenna 5, and a no-power-fed element 9.

The window glass 1 is a glass plate having a horizontally long, virtually rectangular shape, and is attached to a rear part of the body. The window glass 1 includes a transparent area 11 being transparent and a shading area 12 to shade light. As illustrated in FIG. 1, the shading area 12 is provided around the transparent area 11. Note that the shape of the window glass 1 is not limited to that of the example in FIG. 1.

The shading film 2 is a film provided on the surface of the window glass 1 for shading. The shading film 2 is formed of, for example, ceramics such as black ceramic. As illustrated in FIG. 1, the shading film 2 is provided on the fringes of the window glass 1. By providing the defogger electrodes 31a and 31b, the power feeding points 61, 71, and 81, and the no-power-fed element 9, which will be described later, on the shading film 2, it is possible to make these elements not visible from the outside of the vehicle. Thereby, it is possible to raise the designability of the window glass for the vehicle.

Among parts of the window glass 1, a part on which the shading film 2 is not provided corresponds to the transparent area 11, and a part on which the shading film 2 is provided corresponds to the shading area 12. In the following, providing (placing) an element of the window glass 1 on an inner side of the shading film 2 will be referred to as providing (placing) the element in the transparent area 11 when appropriate. Also, providing (placing) an element of the window glass 1 on the shading film 2 will be referred to as providing (placing) the element in the shading area 12.

The defogger 3 is a device to prevent dew condensation and freeze on the window glass 1. The defogger 3 includes the defogger electrodes 31a and 31b, multiple horizontal wires 32 (first wires), multiple vertical wires 33, and an element 34 (defogger element, see FIG. 8).

The defogger electrodes 31a and 31b are vertically long electrodes to flow a current into the horizontal wires 32 and the vertical wires 33, and are provided in the shading area 12. The defogger electrode 31a is connected to a power source, and the defogger electrode 31b is connected to ground (the body).

The horizontal wire 32 is a wire extended in the horizontal direction, and has one end connected to the defogger electrode 31a, and the other end connected to the defogger electrode 31b. Multiple horizontal wires 32 are placed in parallel at equal intervals by the first interval in the vertical direction. The first interval is, for example, 25 mm. The number of horizontal wires 32 to be provided in the defogger 3 can be designed discretionarily.

The vertical wire 33 is a wire extended in the vertical direction, and has one end connected to a horizontal wire 32 placed at the uppermost part, and the other end connected to the horizontal wire 32 placed at the lowermost part. Also, the vertical wire 33 connects multiple crossing horizontal wires 32 with each other. The multiple vertical wires 33 are placed in parallel with each other at predetermined intervals in the horizontal direction. The number of vertical wires 33 to be provided in the defogger 3 can be designed discretionarily.

The defogger 3 flows a current into the horizontal wires 32 and the vertical wires 33 through the defogger electrodes 31a and 31b to heat the horizontal wires 32 and the vertical wires 33, so as to prevent dew condensation and freeze on the window glass 1. Also, the horizontal wires 32 and the vertical wires 33 form a lattice pattern on a part of the transparent area 11.

The element 34 is an element for raising the antenna sensitivity of the glass antenna 5, and is formed of multiple wires. The element 34 is placed close to a horizontal wire 32 and has one end placed at the uppermost part of the defogger 3. The element 34 will be described later in detail.

Note that in this specification, a "wire" means a linear conductive wire. A wire may be formed, for example, by printing a paste that contains metal, such as a silver paste, on the surface of the window glass 1, and baking the paste. Alternatively, a wire may be formed by sticking a linear material or a foil material made of a conductive substance such as copper on the surface of the window glass 1 by an adhesive or the like, or may be formed to be sandwiched between two glass plates constituting a laminated glass. Also, an "element" means a single or multiple connected wires used for receiving a radio wave.

The no-power-fed wire 4 is a wire extended in the vertical direction or in the horizontal direction provided for raising the designability of the window glass for a vehicle. Every no-power-fed wire 4 is not connected to any of the electrodes and no current flows therein. The no-power-fed wires 4 are placed so as to make up for gaps between wires forming the defogger 3 and the glass antenna 5. For example, in the example in FIG. 1, a no-power-fed wire 4a extended in the horizontal direction is placed on a line extending from each of the horizontal wires constituting the glass antenna 5. Also, a no-power-fed wire 4b extended in the vertical direction is placed on a line extending from the vertical wire 33 of the defogger 3. Placing the no-power-fed wires 4 in this way enables to form a nearly latticed pattern (referred to as a "lattice pattern", below) on the window glass 1 as illustrated in FIG. 1. Thereby, it is possible to raise the designability of the window glass used for a vehicle.

Also, in the example in FIG. 1, close to the glass antenna 5, multiple short no-power-fed wires 4c and 4d are placed instead of a single long no-power-fed wire 4. By shortening the no-power-fed wires 4 to be placed close to the glass antenna 5 in this way, it is possible to inhibit influence on the glass antenna 5 by the no-power-fed wires 4.

The glass antenna 5 is an antenna including multiple wires formed on the surface of the window glass 1. A part of wires of the glass antenna 5 forms a lattice pattern on the window glass 1 together with the horizontal wires 32, the vertical wires 33, and the no-power-fed wires 4 of the defogger 3.

Figure 2:
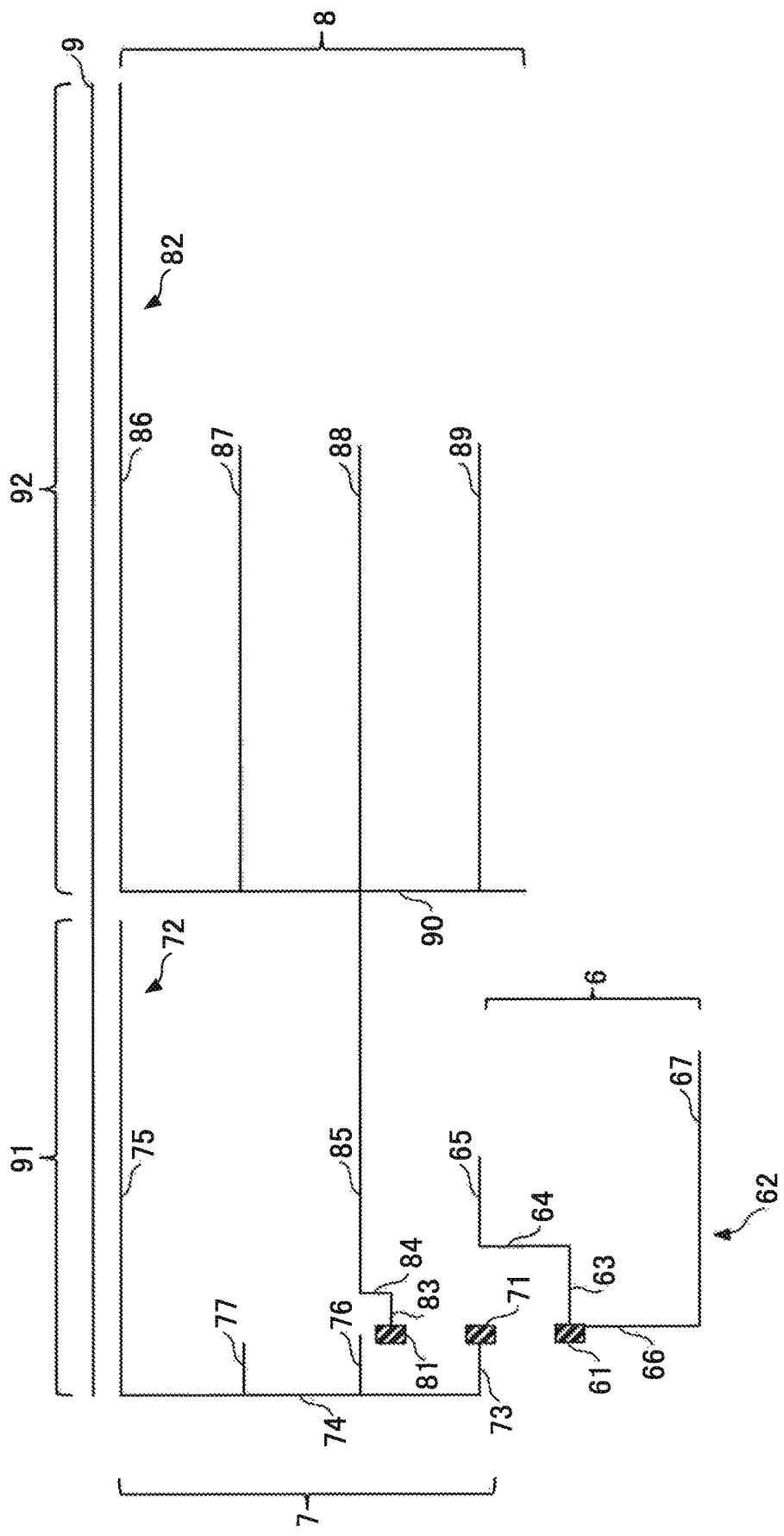
FIG. 2 is an enlarged view of a part of the glass antenna in FIG. 1.

FIG. 2 is an enlarged view of a part of the glass antenna 5 in FIG. 1. As illustrated in FIG. 2, the glass antenna 5 includes an FM/DAB antenna 6 (a first antenna), an RKE antenna 7 (a second antenna), and an AM antenna 8 (a third antenna).

The FM/DAB antenna 6 is an antenna for receiving at least one of an FM broadcasting signal and a DAB signal. The frequency band of FM broadcasting signals ranges from 76 MHz to 108 MHz, and the central wavelength on the glass surface is 2087 mm. The frequency band of DAB signals ranges from 170 MHz to 240 MHz, and the central wavelength on the glass surface is 937 mm. The FM/DAB antenna 6 is formed to be capable of receiving a signal in these frequency bands. The FM/DAB antenna 6 includes a power feeding point 61 (a first power feeding point) and an element 62 (a first element).

The power feeding point 61 is an electrode for connecting the element 62 with a signal processing circuit such as an amplifier (not illustrated), and is provided in the shading area 12 so as not to be visible from the outside of the vehicle. The power feeding point 61 is formed as a planar pattern on the surface of the window glass 1 by the same forming method as used for the wires. In the example in FIG. 2, although the power feeding point 61 is shaped to be quadrangular, the shape can be designed discretionarily, including a circle and a rectangle.

The element 62 is a part to receive at least one of an FM broadcasting signal and a DAB signal. The element 62 is connected to the power feeding point 61, to input a current proportional to a received signal (a radio wave) into a signal processing circuit. The element 62 includes a horizontal wire 63, a vertical wire 64, a horizontal wire 65, a vertical wire 66, and a horizontal wire 67. In the following, among terminal parts of each wire included in the glass antenna 5, a terminal part close to the power feeding point will be referred to as a "starting point", and a terminal part distant from a power feeding point will be referred to as a "terminal point".

The horizontal wire 63 is a wire extended rightward in the horizontal direction from the starting point, having the starting point connected to the power feeding point 61, and the terminal point connected to the starting point of the vertical wire 64.

The vertical wire 64 is a wire extended upward in the vertical direction from the starting point, having the starting point connected to the terminal point of the horizontal wire 63, and the terminal point connected to the starting point of the horizontal wire 65.

The horizontal wire 65 is a wire extended rightward in the horizontal direction from the starting point, having the starting point connected to the terminal point of the vertical wire 64. The terminal point of the horizontal wire 65 coincides with the terminal point of the element 62 forming the single path. The length of the path formed by the horizontal wire 63, the vertical wire 64, and the horizontal wire 65 is, for example, 110 mm.

The vertical wire 66 is a wire extended downward in the vertical direction from the starting point, having the starting point connected to the power feeding point 61, and the terminal point connected to the starting point of the horizontal wire 67. The vertical wire 66 forms a bending part (a first bending part) together with the horizontal wire 63.

The horizontal wire 67 is a wire extended rightward in the horizontal direction from the starting point, having the starting point connected to the terminal point of the vertical wire 66. The terminal point of the horizontal wire 67 corresponds to the terminal point of one of the paths in the element 62. The horizontal wire 67 forms the longest path and a bending part (a first bending part) of the element 62 together with the vertical wire 66. The horizontal wire 67 is placed between the uppermost horizontal wire 32 of the defogger 3 and the horizontal wire 36, which will be described later, separated by the first interval. The length of the path formed by the vertical wire 66 and the horizontal wire 67 is, for example, 180 mm.

As illustrated in FIG. 1, the horizontal wire 63, the vertical wire 64, and a part of the horizontal wire 65 are placed in the shading area 12. The other part of the horizontal wire 65 is placed in the transparent area 11, to form a part of the lattice pattern. The horizontal wire 63 and the vertical wire 64 act as connecting wires for placing the horizontal wire 65 at a position at which the other part of the horizontal wire 65 can be conducive to forming the lattice pattern.

Similarly, the vertical wire 66 (a fourth part) and a part of the horizontal wire 67 are placed in the shading area 12. The other part of the horizontal wire 67 is placed in the transparent area 11, to form a part of the lattice pattern. The vertical wire 66 acts as a connecting wire for placing the horizontal wire 67 at a position at which the other part of the horizontal wire 67 can be conducive to forming the lattice pattern.

Note that in the embodiment, the shape of the element 62 is not limited to that of the example in FIG. 2. The element 62 can be designed to have any shape and any length as long as at least one of an FM broadcasting signal and a DAB signal can be received, and the elements 62, 72, and 82 can be placed as will be described later.

The RKE antenna 7 is an antenna for receiving an RKE signal. The frequency of an RKE signal may be 314 MHz, 434 MHz, 868 MHz, or the like. The RKE antenna 7 is formed so as to be capable of receiving these frequencies. As illustrated in FIG. 2, the RKE antenna 7 includes a power feeding point 71 (a second power feeding point) and an element 72 (a second element).

The power feeding point 71 is an electrode for connecting the element 72 with a signal processing circuit such as an amplifier (not illustrated), and is provided on the shading film 2 so as not to be visible from the outside of the vehicle. The power feeding point 71 is formed as a planar pattern on the surface of the window glass 1 by the same forming method as used for the wires. In the example in FIG. 2, although the power feeding point 71 is shaped to be quadrangular, the shape can be designed discretionarily, including a circle and a rectangle. As illustrated in FIG. 2, the power feeding point 71 is placed next to the power feeding point 61. Note that in this specification, two members being placed "next to" each other means two members having a gap between the two, not contacting each other. For example, as illustrated in FIG. 2, there is a gap between the power feeding point 71 and the power feeding point 61.

The element 72 is a part to receive an RKE signal. The element 72 is connected to the power feeding point 71, and inputs a current into a signal processing circuit depending on a received signal (a radio wave). The element 72 in FIG. 2 includes a horizontal wire 73, a vertical wire 74, a horizontal wire 75, a horizontal wire 76, and a horizontal wire 77.

The horizontal wire 73 is a wire extended leftward in the horizontal direction from the starting point, having the starting point connected to the power feeding point 71, and the terminal point connected to the starting point of the vertical wire 74.

The vertical wire 74 is a wire extended upward in the vertical direction from the starting point, having the starting point connected to the terminal point of the horizontal wire 73, and the terminal point connected to the starting point of the horizontal wire 75. The length of the vertical wire 74 is, for example, 72 mm.

The horizontal wire 75 is a wire extended rightward in the horizontal direction from the starting point, having the starting point connected to the terminal point of the vertical wire 74. The terminal point of the horizontal wire 75 corresponds to the terminal point of one of the paths in the element 72. The horizontal wire 75 forms the longest path of the element 72 together with the horizontal wire 73 and the vertical wire 74. The length of the horizontal wire 75 is, for example, 328 mm.

The horizontal wire 76 is a wire extended rightward in the horizontal direction from the starting point, having the starting point connected to a first intermediate point of the vertical wire 74. The terminal point of the horizontal wire 76 corresponds to the terminal point of one of the paths in the element 72. The first intermediate point can be designed discretionarily depending on the length of the horizontal wire 76. The length of the horizontal wire 76 is, for example, 18 mm.

The horizontal wire 77 is a wire extended rightward in the horizontal direction from the starting point, having the starting point connected to a second intermediate point of the vertical wire 74. The terminal point of the horizontal wire 77 corresponds to the terminal point of one of the paths in the element 72. The second intermediate point can be designed discretionarily depending on the length of the horizontal wire 77. The length of the horizontal wire 77 is, for example, 18 mm.

As illustrated in FIG. 1, the horizontal wire 73, the vertical wire 74, the horizontal wires 76 and 77, and the horizontal wire 75 are placed in the shading area 12.

Also, as can be understood from the above description, the element 72 is placed so as to detour the AM antenna 8. In other words, the element 72 is placed so that a part of the longest path (a part of the vertical wire 74, and the horizontal wire 75) is placed on the side opposite to the power feeding point 71 with respect to a imaginary line in the horizontal direction that passes through the power feeding point 81 of the AM antenna 8, which will be described later.

Note that in the embodiment, the shape of the element 72 is not limited to that of the example in FIG. 2. The element 72 can be designed to have any shape and any length as long as an RKE signal can be received, and the elements 62, 72, and 82 can be placed as will be described later.

The AM antenna 8 is an antenna for receiving an AM broadcasting signal. The frequency band of AM broadcasting signals is from 531 kHz to 1720 kHz. The AM antenna 8 is formed so as to be capable of receiving this frequency band. Also, the AM antenna 8 is placed so as not to be capacitively coupled with the RKE antenna 7 directly. As illustrated in FIG. 2, the AM antenna 8 includes the power feeding point 81 (a third power feeding point) and an element 82 (a third element).

The power feeding point 81 is an electrode for connecting the element 82 with a signal processing circuit such as an amplifier (not illustrated), and is provided in the shading area 12 so as not to be visible from the outside of the vehicle. The power feeding point 81 is formed as a planar pattern on the surface of the window glass 1 by the same forming method as used for the wires. In the example in FIG. 2, although the power feeding point 81 is shaped to be quadrangular, the shape can be designed discretionarily, including a circle and a rectangle. As illustrated in FIG. 2, the power feeding point 81 is placed next to the power feeding point 71. In other words, the power feeding point 81 is placed on the side opposite to the power feeding point 61 such that the power feeding point 71 is interposed in-between.

Note that the interval between the power feeding point 71 and the power feeding point 81 may be the same as or may be different from the interval between the power feeding point 71 and the power feeding point 61. Also, in the example in FIG. 2, although the power feeding points 61, 71, and 81 are placed in a line in the vertical direction, the points may be placed in a line in the horizontal direction, or may be placed to be shifted from each other in the vertical direction or in the horizontal direction. In any case, the power feeding points 61, 71, and 81 are placed so that the power feeding point 71 comes next to the power feeding point 61 and the power feeding point 81 comes next to the power feeding point 71.

The element 82 is a part to receive an AM broadcasting signal. The element 82 is connected to the power feeding point 81, and inputs a current into a signal processing circuit depending on a received signal (a radio wave). Since a reception frequency of the AM antenna 8 is less than or equal to about one-hundredth of reception frequencies of the FM/DAB antenna 6 and the RKE antenna, the element 82 includes a longest path that is longer than the longest paths of the elements 62 and 72 as illustrated in FIG. 2. The element 82 in FIG. 2 includes a horizontal wire 83, a vertical wire 84, horizontal wires 85 to 89, and a vertical wire 90.

The horizontal wire 83 is a wire extended rightward in the horizontal direction from the starting point, having the starting point connected to the power feeding point 81, and the terminal point connected to the starting point of the vertical wire 84.

The vertical wire 84 is a wire extended upward in the vertical direction from the starting point, having the starting point connected to the terminal point of the horizontal wire 83, and the terminal point connected to the starting point of the horizontal wire 85.

The horizontal wire 85 is a wire extended rightward in the horizontal direction from the starting point, having the starting point connected to the terminal point of the vertical wire 84, and the terminal point connected to the starting point of the horizontal wire 88 (a second intermediate point of the vertical wire 90).

The horizontal wire 86 is a wire extended rightward in the horizontal direction from the starting point, having the starting point connected to the terminal point of the vertical wire 90. The terminal point of the horizontal wire 86 corresponds to the terminal point of one of the paths of the element 82. The horizontal wire 86 is placed on the same imaginary line as the horizontal wire 75. The length of the horizontal wire 86 is, for example, 700 mm.

The horizontal wire 87 is a wire extended rightward in the horizontal direction from the starting point, having the starting point connected to a first intermediate point of the vertical wire 90. The terminal point of the horizontal wire 87 corresponds to the terminal point of one of the paths of the element 82. The length of the horizontal wire 87 is, for example, 378 mm.

The horizontal wire 88 is a wire extended rightward in the horizontal direction from the starting point, having the starting point connected to the second intermediate point of the vertical wire 90 (the terminal point of the horizontal wire 85). The terminal point of the horizontal wire 88 corresponds to the terminal point of one of the paths of the element 82. The length of the horizontal wire 88 is, for example, 378 mm.

The horizontal wire 89 is a wire extended rightward in the horizontal direction from the starting point, having the starting point connected to a third intermediate point of the vertical wire 90. The terminal point of the horizontal wire 89 corresponds to the terminal point of one of the paths of the element 82. The length of the horizontal wire 89 is, for example, 378 mm.

The vertical wire 90 is a wire extended upward in the vertical direction from the starting point, having the terminal point connected to the starting point of the horizontal wire 86. The starting point of the vertical wire 90 corresponds to the terminal point of one of the paths of the element 82. A part of the vertical wire 90 (from the second intermediate point to the terminal point) constitutes the longest path of the element 82 together with the horizontal wire 83, the vertical wire 84, the horizontal wire 85, and the horizontal wire 86. The length of the vertical wire 90 is, for example, 104 mm.

As illustrated in FIG. 1, the horizontal wire 83, the vertical wire 84, and a part of the horizontal wire 85 are placed in the shading area 12. The other part of the horizontal wire 85, the horizontal wires 86 to 89, and the vertical wire 90 are placed in the transparent area 11, to form a part of the lattice pattern. The horizontal wire 83 and the vertical wire 84 act as connecting wires for placing the horizontal wire 85, the horizontal wires 86 to 89, and the vertical wire 90 at positions at which the other part of the horizontal wire 85, the horizontal wires 86 to 89, and the vertical wire 90 can be conducive to forming the lattice pattern. Also, the horizontal wires 86 to 89 (the first to third intermediate points and the terminal point of the vertical wire 90) are placed in parallel at equal intervals in the vertical direction so that the horizontal wires 86 to 89 can be conducive to forming the lattice pattern.

Note that in the embodiment, the shape of the element 82 is not limited to that of the example in FIG. 2. The element 82 can be designed to have any shape and any length as long as an AM signal can be received, and the elements 62, 72, and 82 can be placed as will be described later. For example, in the example in FIG. 2, although a part of the longest path of the element 82 is placed between the elements 62 and 72, the entirety of the longest path of the element 82 may be placed between the elements 62 and 72.

The no-power-fed element 9 is an element provided to adjust the reception frequencies of the RKE antenna 7. The no-power-fed element 9 is provided on the shading film 2, not connected to any of the electrodes, and no current is flowed into. In the example in FIG. 2, the no-power-fed element 9 is formed of a single wire. The length of the no-power-fed element 9 is, for example, 1030 mm. The no-power-fed element 9 includes a first overlapping part 91 and a second overlapping part 92. The no-power-fed element 9 will be described later in detail.

Next, effects of the window glass for a vehicle according to the embodiment will be described.

In a conventional window glass for a vehicle, if the power feeding points of the antennas are placed in a line in order of the power feeding points 61, 71, and 81 as in the example in FIG. 2, the elements of the antennas would be placed in order of the elements 62, 72, and 82. Consequently, the element 62 and the element 72 would be placed next to each other, and the receiving sensitivity of the FM/DAB antenna 6 and the RKE antenna 7 would decline. This is because proximity of the reception frequencies of the FM/DAB antenna 6 and the RKE antenna 7 would generate an interference between the two antennas.

On the other hand, according to the embodiment, placing the element 72 so as to detour the AM antenna 8 enables the elements of the antennas to be placed in order of the elements 62, 82, and 72. In other words, at least a part of the element 82 is placed between the element 62 and the element 72. Consequently, the element 62 and the element 82 are placed next to each other, and the element 82 and the element 72 are placed next to each other.

As described above, the reception frequency of the AM antenna 8 is less than or equal to about one-hundredth the reception frequencies of the FM/DAB antenna 6 and the RKE antenna 7. Therefore, even if the element 62 and the element 82 are placed next to each other, an interference is hardly generated between the FM/DAB antenna 6 and the AM antenna 8. Similarly, even if the element 72 and the element 82 are placed next to each other, an interference is hardly generated between the RKE antenna 7 and the AM antenna 8. Furthermore, placing the AM antenna 8 between the element 62 and the element 72 inhibits interference between the FM/DAB antenna 6 and the RKE antenna 7.

Consequently, according to the embodiment, compared with a conventional window glass for a vehicle, it is possible to prevent interference between the FM/DAB antenna 6 and the RKE antenna 7, and to raise the receiving sensitivity of both of the antennas.

Here, FIG. 3 is a diagram illustrating a comparative example 1 of a glass antenna. The comparative example 1 is a glass antenna in which a conventional arrangement of elements is applied to a glass antenna 5 according to the embodiment. In other words, the comparative example 1 includes an FM/DAB antenna 6, an RKE antenna 7, and an AM antenna 8, and the power feeding points of the antennas are placed in order of the power feeding points 61, 71, and 81, and the elements of the antennas are placed in order of the elements 62, 72, and 82.

FIG. 4 is a diagram illustrating a comparative example 2 of a glass antenna. The comparative example 2 is a glass antenna in which the FM/DAB antenna 6 is removed from the comparative example 1. In other words, the comparative example 2 includes an RKE antenna 7 and an AM antenna 8, and the power feeding points of the antennas are placed in order of the power feeding points 71 and 81, and the elements of the antennas are placed in order of the elements 72 and 82.

FIG. 5 is a graph illustrating an experimental result of the antenna sensitivity of a DAB signal, obtained for the glass antenna 5 in FIG. 2 (referred to as the "application example", below) and the comparative example 1. A solid line in FIG. 5 represents the antenna sensitivity of the application example, and a dashed line represents the antenna sensitivity of the comparative example 1. Since the comparative example 2 does not include an FM/DAB antenna 6, no experimental result is included in FIG. 5.

As illustrated in FIG. 5, on the whole, the antenna sensitivity of the application example is higher than the antenna sensitivity of the comparative example 1. From this result, it is understood that the interference to the FM/DAB antenna 6 by the RKE antenna 7 is better inhibited by the configuration of the application example than by that of the comparative example 1.

FIG. 6 is a graph illustrating an experimental result of return loss of an RKE signal, obtained with the application example, the comparative example 1, and the comparative example 2. A solid line in FIG. 6 represents the return loss of the application example, a dotted line represents the return loss of the comparative example 1, and a dashed line represents the return loss of the comparative example 2. A smaller return loss indicates a higher performance of the RKE antenna 7.

As illustrated in FIG. 6, on the whole, the return loss of the comparative example 1 is greater compared with the return loss of the comparative example 2. From this result, it is understood that the performance of the RKE antenna 7 of the comparative example 1 is reduced by the interference caused by the FM/DAB antenna 6 placed next to the RKE antenna 7.

Also, on the whole, the return loss of the application example is smaller compared with the return loss of the comparative example 1. From this result, it is understood that the interference to the RKE antenna 7 by the FM/DAB antenna 6 is better inhibited by the configuration of the application example than by that of the comparative example 1.

As described above, according to the embodiment, at least a part of the element 82 of the AM antenna 8 is placed between the elements 62 and 72 of the FM/DAB antenna 6 and the RKE antenna 7. Such a configuration enables to inhibit interference between the FM/DAB antenna 6 and the RKE antenna 7, and to inhibit the receiving sensitivity of the FM/DAB antenna 6 and the RKE antenna 7 from declining by interference. Consequently, it is possible to raise the receiving sensitivity of the FM/DAB antenna 6 and the RKE antenna 7.

Note that the configuration of the glass antenna according to the embodiment is not limited to that of the example in FIG. 2. The embodiment can be applied to any glass antenna that includes antennas H1 and H2 having close reception frequencies, and an antenna L having a reception frequency that is sufficiently lower compared with the antennas H1 and H2, in which the power feeding points of the antennas are placed next to each other in order of the antennas H1, H2, and L.

Although the antennas H1 and H2 correspond to the FM/DAB antenna 6 and the RKE antenna 7 in the example in FIG. 2, respectively, it is not limited as such. Here, "antennas H1 and H2 having close reception frequencies" means that the reception frequency of the antenna H1 is greater than or equal to one-tenth and less than or equal to 10 times the reception frequency of the antenna H2.

Also, although the antenna L corresponds to the AM antenna 8 in the example in FIG. 2, it is not limited as such. Here, "an antenna L having a reception frequency that is sufficiently lower compared with the antennas H1 and H2" means that the reception frequency of the antenna L is less than or equal to, for example, one-tenth the reception frequency of the antennas H1 and H2.

Here, FIGS. 7A to 7C are diagrams schematically illustrating variations of glass antennas according to the embodiment.

In the example in FIG. 7A, an element of an antenna H1 is placed so as to detour an antenna L. In other words, a part of the element (a first element) of the antenna H1 is placed on the side opposite to the power feeding point of the antenna H1 with respect to an imaginary line in the horizontal direction that passes through the power feeding point (a third power feeding point) of the antenna L.

In the example in FIG. 7B, an element of an antenna H2 is placed so as to detour an antenna L. In other words, a part of the element (a second element) of the antenna H2 is placed on the side opposite to the power feeding point of the antenna H2 with respect to a imaginary line in the horizontal direction that passes through the power feeding point (a third power feeding point) of the antenna L. The example in FIG. 7B corresponds to a schematic illustration of the glass antenna 5 in FIG. 2.

In the example in FIG. 7C, the element of an antenna L is placed between antennas H1 and H2. In other words, the element (a third element) of the antenna L is placed so as to pass through between the power feeding point (a first power feeding point) of the antenna H1 and the power feeding point (a second power feeding point) of the antenna H2.

In any of the cases in FIGS. 7A to 7C, since at least a part of the element of the antenna L is placed between the elements of the antennas H1 and H2, it is possible to obtain the above effect of inhibiting the receiving sensitivity of the antennas H1 and H2 from declining by interference. Therefore, it is possible to raise the receiving sensitivity of the antennas H1 and H2.

Second Embodiment

Figure 8:
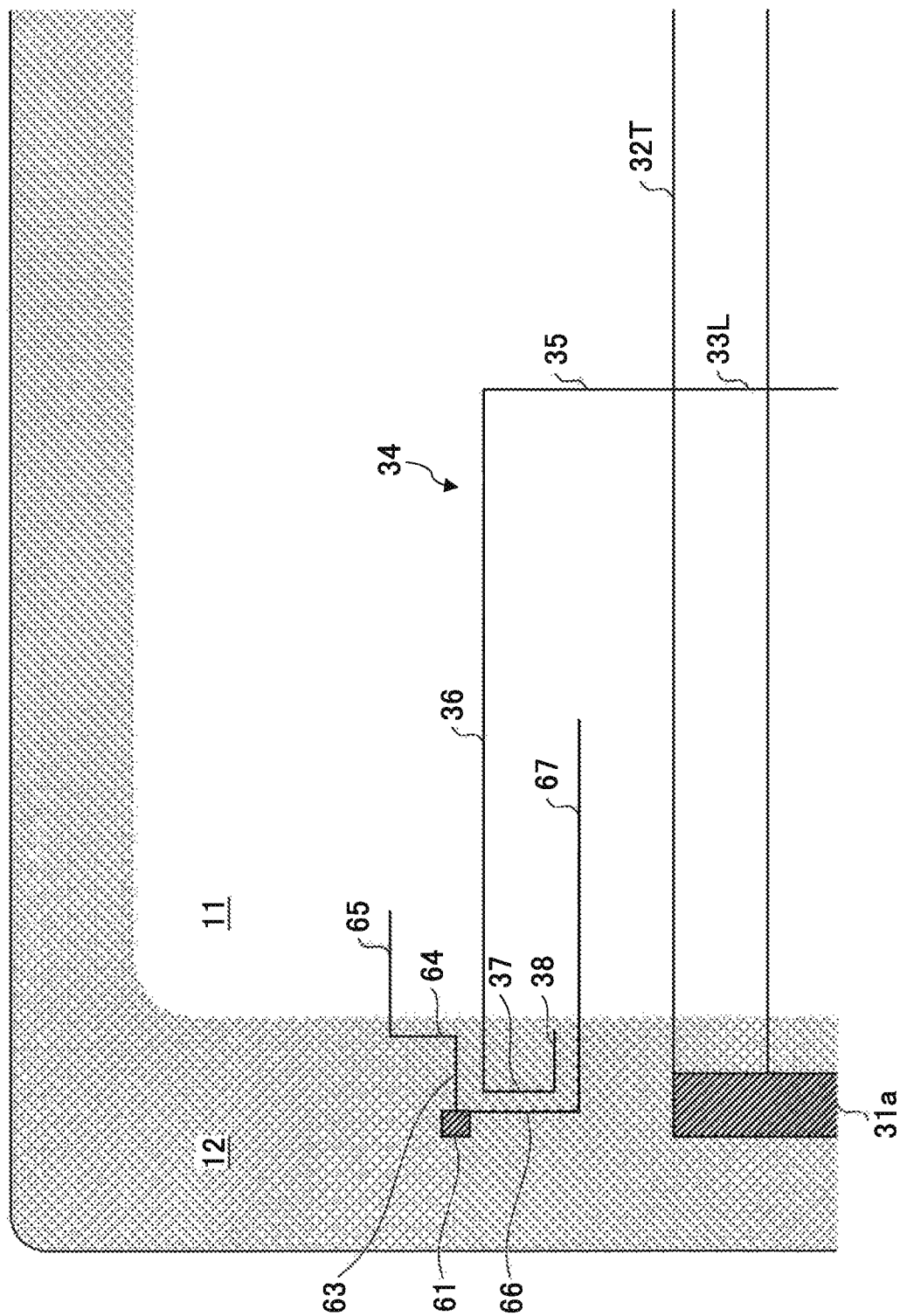
FIG. 8 is a partially enlarged view in which the surroundings of an FM/DAB antenna in FIG. 1 are enlarged.

A window glass for a vehicle according to a second embodiment will be described with reference to FIG. 8 to FIG. 14C. In the embodiment, the element 34 of the defogger 3 will be described in detail. FIG. 8 is a partially enlarged view in which the surroundings of the FM/DAB antenna in FIG. 1 are enlarged. In FIG. 8, the no-power-fed wire 4, the RKE antenna 7, and the AM antenna 8 are omitted for the sake of convenience of description. The element 34 in FIG. 8 includes a vertical wire 35 (a second wire), a horizontal wire 36, a vertical wire 37, and a horizontal wire 38. Among terminal parts of each wire included in the element 34, a terminal part close to the defogger electrode 31*a* or 31*b* will be referred to as a starting point, and a terminal part distant from the defogger electrode 31*a* or 31*b* will be referred to as a terminal point.

The vertical wire 35 is a wire extended upward in the vertical direction from the starting point, having the terminal point connected to the starting point of the horizontal wire 32. The starting point of the vertical wire 35 is connected to the intersection of the horizontal wire 32 placed at the uppermost part, and the vertical wire 33. In other words, the vertical wire 35 connects the horizontal wire 32 placed at the uppermost part, and the horizontal wire 36. In the following, the horizontal wire 32 having the vertical wire 35 connected will be referred to as the "horizontal wire 32T", and the vertical wire 33 having the vertical wire 35 connected will be referred to as the "vertical wire 33L".

As can be seen from FIG. 8, the vertical wire 35 corresponds to an upward extension part of the vertical wire 33L. In other words, the vertical wire 33L and the vertical wire 35 form a single wire. The length of the vertical wire 35 is, for example, 50 mm. Also, the sum of the lengths of the vertical wire 33L and the vertical wire 35 is, for example, 380 mm.

The horizontal wire 36 is a wire extended leftward in the horizontal direction from the starting point, having the starting point connected to the terminal point of the vertical wire 35, and the terminal point connected to the starting point of the vertical wire 37. The horizontal wire 36 and the horizontal wire 32T are placed at an interval twice the first interval. Thereby, it is possible to form a part of the lattice pattern by a part (a first part) of the horizontal wire 36 placed in the transparent area 11. The length of the horizontal wire 36 is, for example, 320 mm.

The vertical wire 37 is a wire extended downward in the vertical direction from the starting point, having the starting point connected to the terminal point of the horizontal wire 36, and the terminal point connected to the starting point of the horizontal wire 38. The length of the vertical wire 37 is, for example, 20 mm.

The horizontal wire 38 is a wire extended rightward in the horizontal direction from the starting point, having the starting point connected to the terminal point of the vertical wire 37. The terminal point of the horizontal wire 38 corresponds to the terminal point of the element 34. The length of the vertical wire 38 is, for example, 20 mm.

As illustrated in FIG. 8, a part of the horizontal wire 36, the vertical wire 37, and the horizontal wire 38 (a second part) are provided in the shading area 12, and are placed to have a second interval, which is narrower than the first interval, with respective parts of the element 62. Specifically, the part of the horizontal wire 36 is placed to have the second interval with the horizontal wire 63. The vertical wire 37 is placed to have the second interval with the vertical wire 66. The horizontal wire 38 is placed to have the second interval with the part of the horizontal wire 67. The second interval is an interval less than or equal to 5 mm, for example, 2 mm. The second interval may be the same for or different for each wire.

Also, the horizontal wire 36 and the vertical wire 37 form a bending part (a second bending part). This bending part is placed along a bending part formed by the horizontal wire 63 and the vertical wire 66. Similarly, the vertical wire 37 and the horizontal wire 38 form a bending part (a second bending part). This bending part is placed along a bending part formed by the vertical wire 66 and the horizontal wire 67.

Next, effects of the window glass for a vehicle according to the embodiment will be described.

As described above, among parts of the element 34 (a fourth element), a part (a first part) placed in the transparent area 11 is placed in parallel with a part (a third part) among parts of the element 62 (a first element) placed in the transparent area 11, to have a first interval. Meanwhile, among the parts of the element 34 (the fourth element), a part (a second part) placed in the shading area 12 is placed in parallel with a part (a fourth part) among parts of the element 62 (the first element) placed in the shading area 12, to have a second interval narrower than the first interval. Consequently, the capacitive coupling of the element 34 and the element 62 in the shading area 12 is stronger than the capacitive coupling of the element 34 and the element 62 in the transparent area 11.

The strength of a capacitive coupling (referred to as a "coupling degree", below) is proportional to the parallel wiring distance of the coupled wires, and is inversely proportional to the parallel wiring interval. Here, "parallel wiring" means two wires being placed in parallel. Then, if the coupling degree is represented by (parallel wiring distance)/(parallel wiring interval), in the example in FIG. 8, the coupling degree of the element 34 and the element 62 in the transparent area 11 is about 5.6. On the other hand, the coupling degree of the element 34 and the element 62 in the shading area 12 is about 30.

In this way, raising the coupling degree of the element 34 and the element 62 in the shading area 12 (i.e., making the capacitive coupling stronger) enables the FM/DAB antenna 6 to receive a radio wave by using the defogger 3. Thereby, it is possible to raise the antenna sensitivity of the FM/DAB antenna 6.

Figure 9:
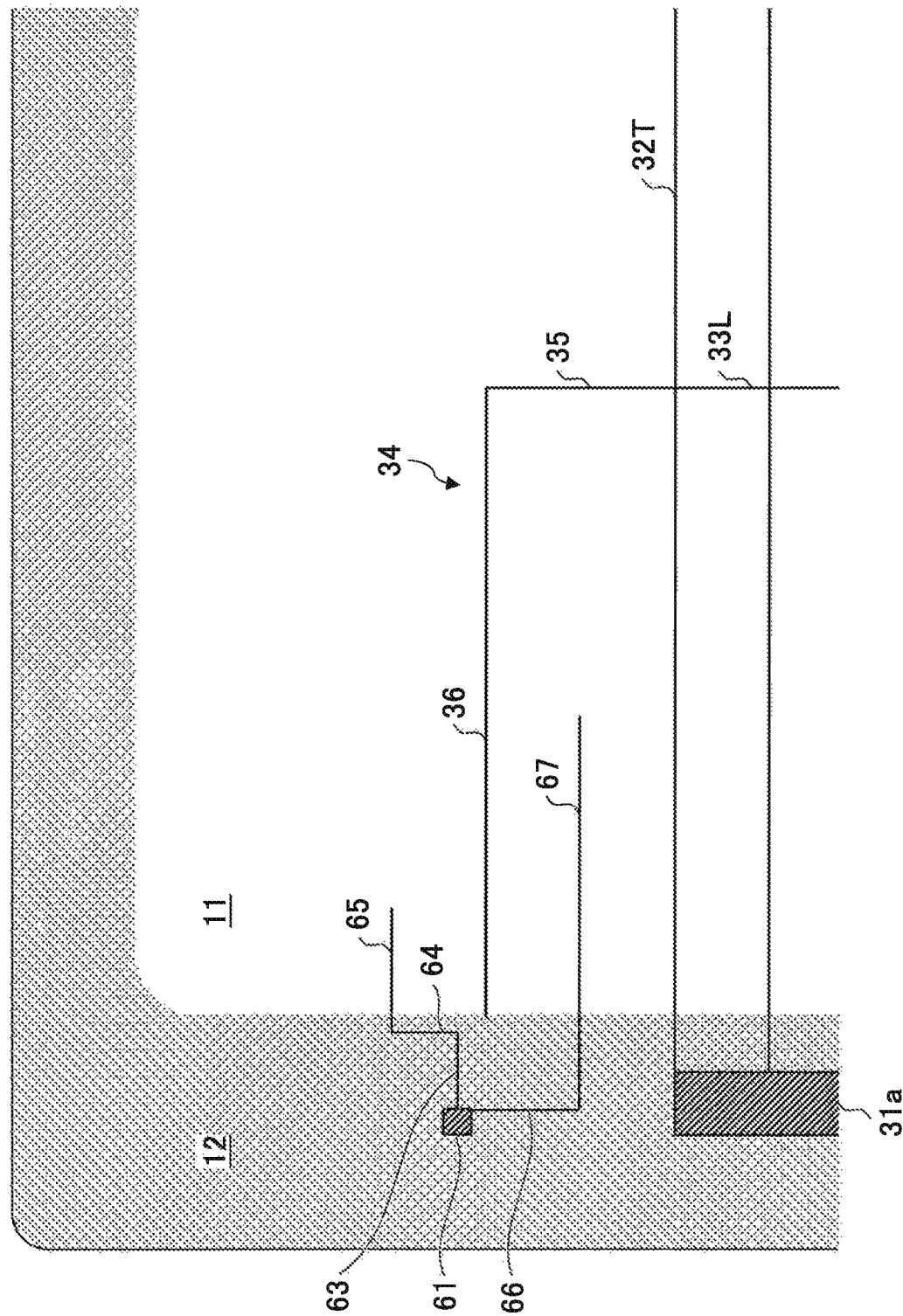
FIG. 9 is a diagram illustrating a comparative example of a window glass for a vehicle.

Here, FIG. 9 is a diagram illustrating a comparative example of a window glass for a vehicle. Unlike the window glass for a vehicle in FIG. 8 (referred to as the "application example", below), the comparative example in FIG. 9 does not have the element 34 that is placed close to the element 62 in the shading area 12. The other components of the comparative example in FIG. 9 are the same as in the application example in FIG. 8.

Figure 10:
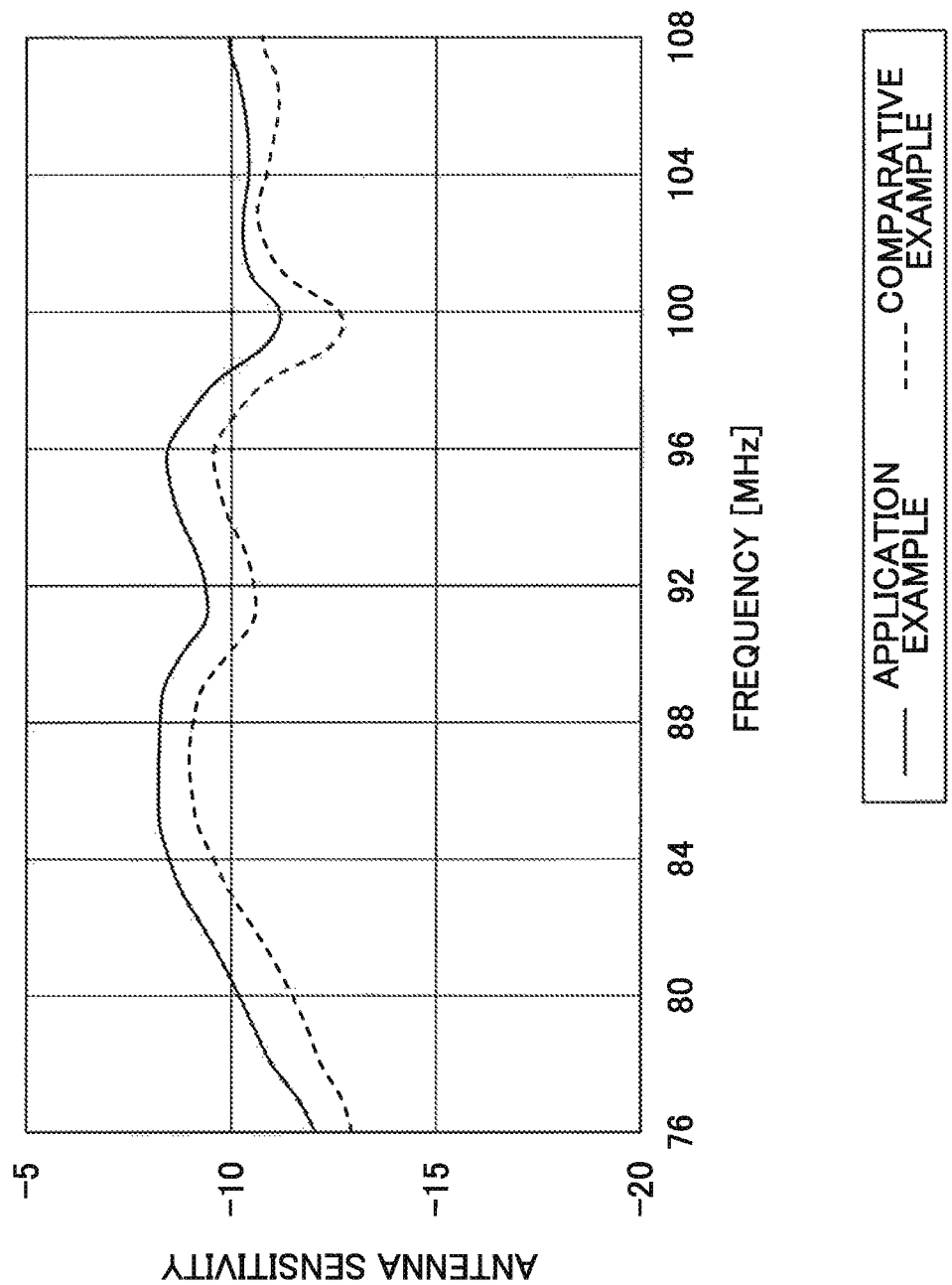
FIG. 10 is a graph illustrating measurement results of the antenna sensitivities of an application example in FIG. 8 and a comparative example in FIG. 9, respectively, for an FM broadcasting signal.

FIG. 10 is a graph illustrating measurement results of the antenna sensitivity of the application example in FIG. 8 and the comparative example in FIG. 9, for an FM broadcasting signal. As illustrated in FIG. 10, it can be understood that the antenna sensitivity of the application example in FIG. 8 is higher than the antenna sensitivity of the comparative example in FIG. 9 over the entire frequency band of FM broadcasting signals.

As described above, according to the embodiment, by narrowing the interval between the element 34 and the element 62 in the shading area 12, and thereby raising the coupling degree, it is possible to raise the antenna sensitivity of the FM/DAB antenna 6.

Also, according to the embodiment, in the transparent area 11, the element 34 and the element 62 are placed to have an equal interval of the first interval, to form respective parts of the lattice pattern. Therefore, according to the embodiment, compared with a conventional method of raising the antenna sensitivity by narrowing the interval between elements in the transparent area 11, it is possible to inhibit the designability of a window glass for a vehicle from declining. Consequently, it is possible to raise the designability of the window glass used for a vehicle.

Note that an optimal length of each wire of the element 34 changes depending on a reception frequency (the central wavelength of reception signals) of the FM/DAB antenna 6. For example, in the example in FIG. 2, it is favorable that the sum of the length of the vertical wires 33L and 35 and the horizontal wire 36 is 700 mm. The reason is as follows.

In general, an element of an antenna resonates with a signal having the length corresponding to ¼ wavelength, ¾ wavelength, 5/4 wavelength, or the like.

In the case of a signal having a high central frequency such as a DAB signal, the impedance becomes sufficiently small between a part (a second part) in the element 34 placed in the shading area 12, and a part (a fourth part) in the element 62 placed in the shading area 12. In other words, the antenna transitions to a state that is substantially the same as if the element 34 (the terminal point of the horizontal wire 36) is connected to the power feeding point 61. Consequently, a part of the element constituted with the vertical wires 33L and 35 and the horizontal wire 36 resonates with a DAB signal having the length of ¼ wavelength, ¾ wavelength, 5/4 wavelength, or the like of the DAB signal.

Therefore, by setting the sum of the lengths of the vertical wires 33L and 35 and the horizontal wire 36 to 700 mm (about ¾ wavelength of a DAB signal), it is possible to cause the element 34 to resonate with the DAB signal. In other words, a DAB signal can be received by the FM/DAB antenna 6.

On the other hand, in the case of a signal having a low central frequency such as an FM broadcasting signal, the impedance does not become sufficiently small between the part (the second part) in the element 34 placed in the shading area 12, and the part (the fourth part) in the element 62 placed in the shading area 12. In other words, the second part and the fourth part function as a shortening capacitor. Consequently, a part of the element constituted with the vertical wires 33L and 35 and the horizontal wire 36 resonates with an FM broadcasting signal if the length is longer than ¼ wavelength, ¾ wavelength, 5/4 wavelength, or the like of the FM broadcasting signal.

Therefore, by setting the sum of the lengths of the vertical wires 33L and 35 and the horizontal wire 36 to 700 mm (about ⅓ wavelength of an FM broadcasting signal (greater than or equal to ¼ wavelength and less than or equal to ¾ wavelength)), it is possible to cause the element 34 to resonate with the FM broadcasting signal. In other words, an FM broadcast can be received by the FM/DAB antenna 6.

The optimal length of each wire of the element 34 as such may be calculated based on the central frequency of reception signals as described above, or may be obtained by an experiment or a simulation.

Also, although the cases have been described that relate to raising the antenna sensitivity of the FM/DAB antenna 6, it is possible to use substantially the same method for raising the antenna sensitivity of the RKE antenna 7 or the AM antenna 8.

Hereinafter, an antenna whose antenna sensitivity is to be raised will be referred to as an "antenna A", and an element connected to the horizontal wire 32T of the defogger 3 for raising the antenna sensitivity of the antenna A will be referred to as an "element E". In the example in FIG. 8, the antenna A corresponds to the FM/DAB antenna 6, and the element E corresponds to the element 34.

FIGS. 11A to 14C are diagrams schematically illustrating variations of glass antennas according to the embodiment.

FIGS. 11A to 14C are partially enlarged views in which the surroundings of the antenna A are enlarged as in FIG. 8.

Figure 11A:
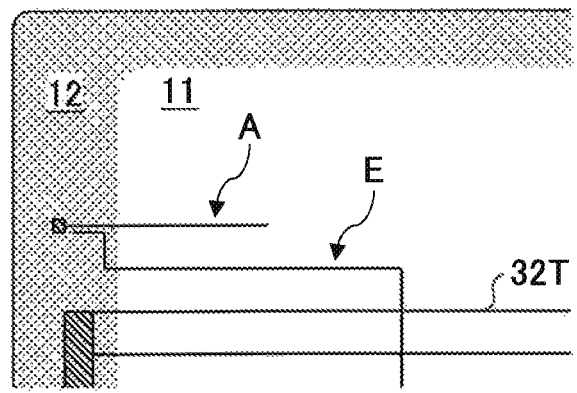
FIGS. 11A to 11C are diagrams schematically illustrating variations of glass antennas according to a second embodiment.
Figure 11B:
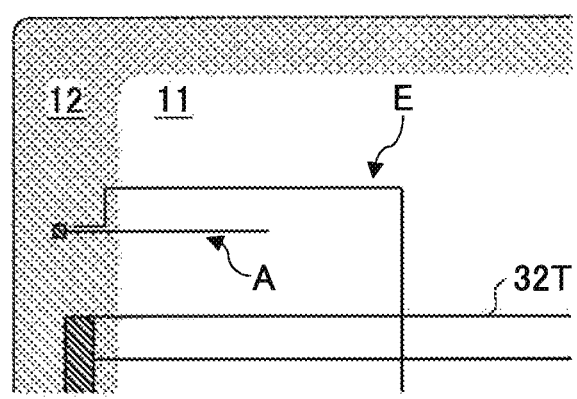
Figure 11C:
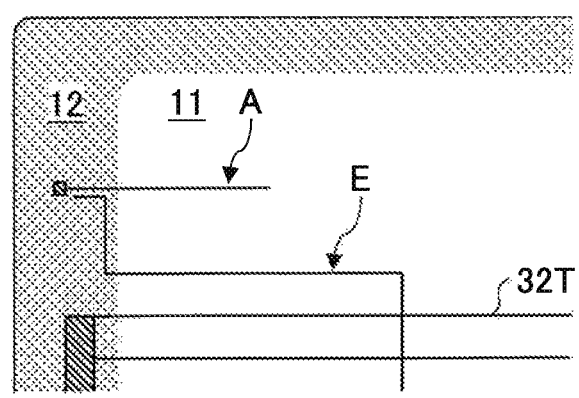

In the examples in FIGS. 11A to 11C, the element of the antenna A is formed of a single wire (a horizontal wire) including no bending part.

In the example in FIG. 11A, the element of the antenna A is placed in the transparent area 11, having an interval of twice the first interval with respect to the horizontal wire 32T. Also, the element E is placed in the transparent area 11, having an interval of the first interval multiplied by unity with respect to the horizontal wire 32T. In other words, the element E placed in the transparent area 11 is placed between the element of the antenna A and the horizontal wire 32T placed in the transparent area 11. In this way, the interval between the element of the antenna A and the horizontal wire 32T placed in the transparent area 11 may be two or a greater integral multiple of the first interval. Also, the interval between the element E and the horizontal wire 32T placed in the transparent area 11 may be the first interval multiplied by unity.

In the example in FIG. 11B, the element of the antenna A is placed in the transparent area 11, having an interval of twice the first interval with respect to the horizontal wire 32T. Also, the element E is placed in the transparent area 11, having an interval of triple the first interval with respect to the horizontal wire 32T. The interval between the element E and the horizontal wire 32T placed in the transparent area 11 may be three or a greater integral multiple of the first interval.

In the example in FIG. 11C, the element of the antenna A is placed in the transparent area 11, having an interval of triple the first interval with respect to the horizontal wire 32T. Also, the element E is placed in the transparent area 11, having an interval of the first interval multiplied by unity with respect to the horizontal wire 32T. In this way, the interval between the element E placed in the transparent area 11 and the element of the antenna A placed in the transparent area 11 may be two or a greater integral multiple of the first interval.

In any of the cases in FIGS. 11A to 11C, since the interval between the element of the antenna A and the element E is narrower in the shading area 12, it is possible to raise the antenna sensitivity of the antenna A. Also, in the transparent area 11, since the element of the antenna A and the element E are placed having respective intervals of integral multiples of the first interval with respect to the horizontal wire 32T, it is possible to raise the designability of the window glass for the vehicle.

Figure 12A:
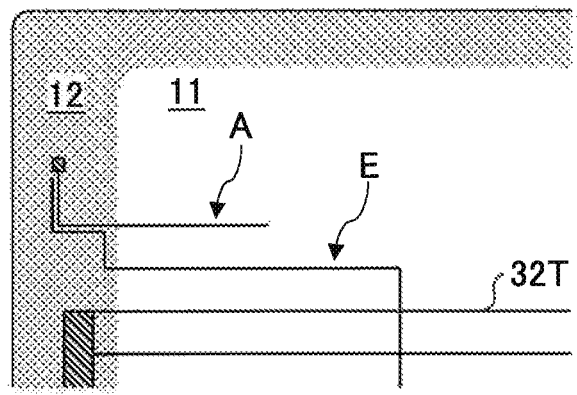
FIGS. 12A to 12C are diagrams schematically illustrating variations of glass antennas according to the second embodiment.
Figure 12B:
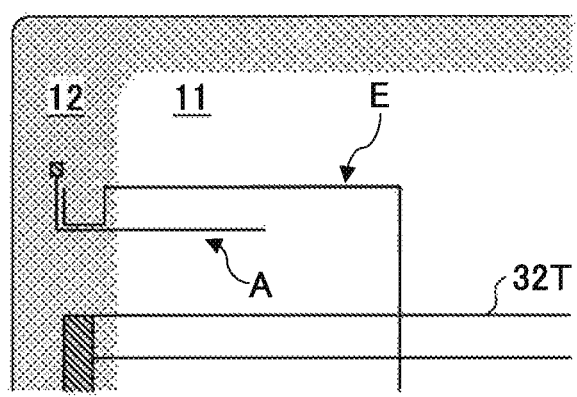
Figure 12C:
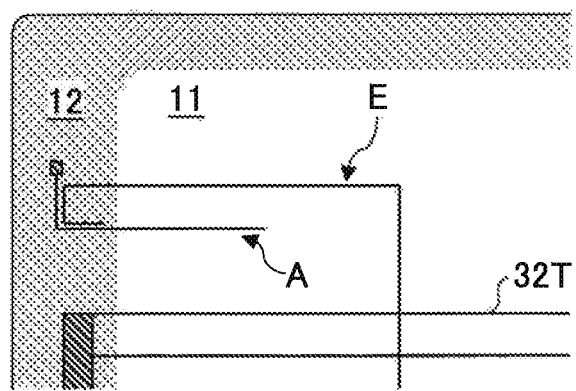

In the example in FIGS. 12A to 12C, as in the example in FIG. 8, the element of the antenna A is formed of two wires (a vertical wire and a horizontal wire) including a bending part in the shading area 12. The element of the antenna A may be formed of three or more wires.

In the example in FIG. 12A, the element of the antenna A is placed, having an interval of twice the first interval with respect to the horizontal wire 32T. Also, the element E is placed in the transparent area 11, having an interval of the first interval multiplied by unity with respect to the horizontal wire 32T. The element E includes a bending part in the shading area 12, placed below and along a bending part of the element of the antenna A.

In the example in FIG. 12B, the element of the antenna A is placed, having an interval of twice the first interval with respect to the horizontal wire 32T. Also, the element E is placed in the transparent area 11, having an interval of triple the first interval with respect to the horizontal wire 32T. The element E includes a bending part in the shading area 12, placed above and along a bending part of the element of the antenna A. The bending part of the element E is formed so that the terminal point of the element E approaches the power feeding point of the antenna A clockwise.

In the example in FIG. 12C, the element of the antenna A is placed, having an interval of twice the first interval with respect to the horizontal wire 32T. Also, the element E is placed in the transparent area 11, having an interval of triple the first interval with respect to the horizontal wire 32T. The element E includes a bending part in the shading area 12, placed above and along a bending part of the element of the antenna A. The bending part of the element E is formed so that the terminal point of the element E is away from the power feeding point of the antenna A counterclockwise.

Configured as in FIGS. 12A to 12C, the length of a part where the element of the antenna A and the element E are placed close to each other becomes longer compared with the examples in FIGS. 11A to 11C. Therefore, it is possible to further raise the antenna sensitivity of the antenna A.

Figure 13A:
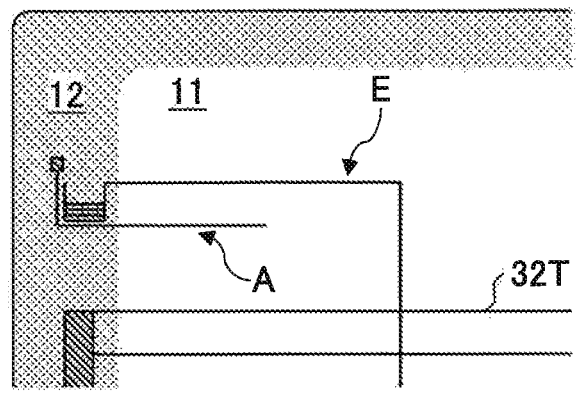
FIGS. 13A to 13B are diagrams schematically illustrating variations of glass antennas according to the second embodiment.
Figure 13B:
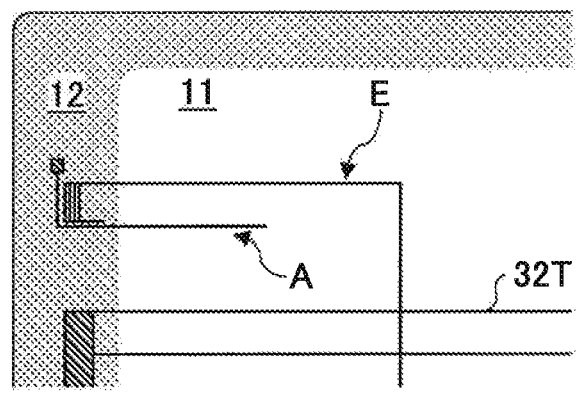

In the example in FIG. 13A, the bending part of the element E in the example in FIG. 12B is modified to be formed by a multifold wire. In the example in FIG. 13B, the bending part of the element E in the example in FIG. 12C is modified to be formed by a multifold wire. Configured as in FIGS. 13A to 13B, the length of a part where the element of the antenna A and the element E are placed close to each other becomes longer compared with the examples in FIGS. 12A to 12C. Therefore, it is possible to further raise the antenna sensitivity of the antenna A.

Figure 14A:
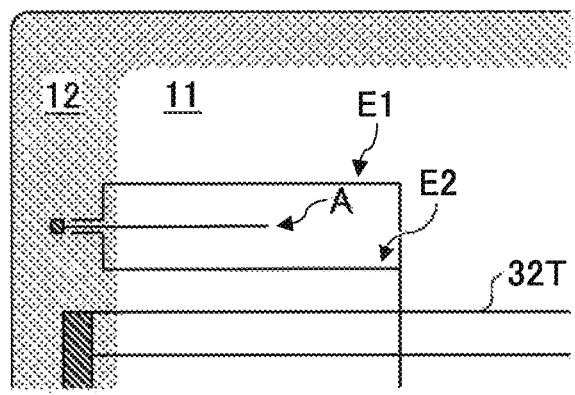
FIG. 14A to 14C are diagrams schematically illustrating variations of glass antennas according to the second embodiment.
Figure 14B:
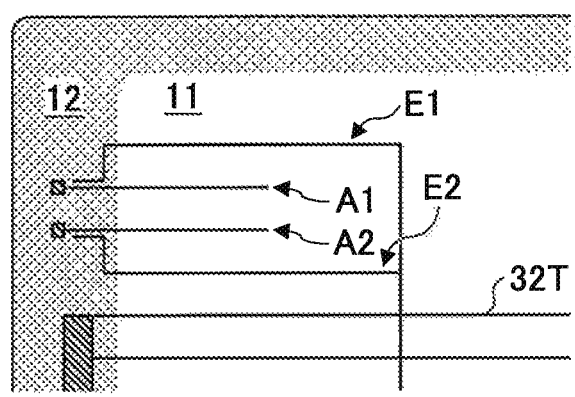
Figure 14C:
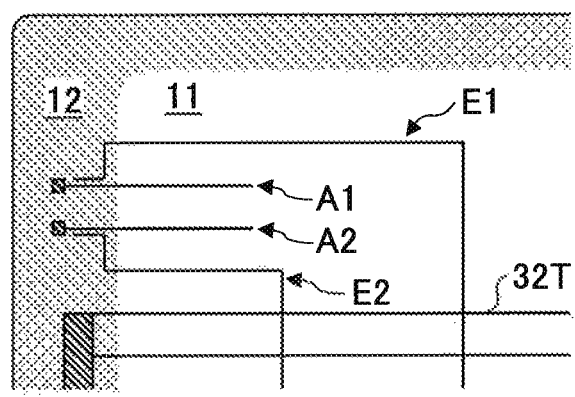

In the examples in FIGS. 14A to 14C, the defogger 3 includes two elements E1 and E2.

In the example in FIG. 14A, the two elements E1 and E2 are placed close to the element of the single antenna A in the shading area 12. Specifically, the element of the antenna A is placed in the transparent area 11, having an interval of twice the first interval with respect to the horizontal wire 32T. The element E1 is placed in the transparent area 11, having an interval of triple the first interval with respect to the horizontal wire 32T, and is placed in the shading area 12, above and close to the element of the antenna A. The element E2 is placed in the transparent area 11, having an interval of the first interval multiplied by unity with respect to the horizontal wire 32T, and is placed in the shading area 12, below and close to the element of the antenna A. The elements E1 and E2 are connected to the same vertical wire 33, a part of which is common. Configured as in FIG. 14A, the length of a part where the element of the antenna A and the element E are placed close to each other becomes longer compared with the examples in FIGS. 11A to 11C. Therefore, it is possible to further raise the antenna sensitivity of the antenna A. Note that three or more elements E may be placed close to the element of a single antenna A.

In the example in FIG. 14B, two elements E1 and E2 in the shading area 12 are placed close to two elements of two antennas A, respectively. Specifically, the element of the antenna A1 is placed in the transparent area 11, having an interval of triple the first interval with respect to the horizontal wire 32T. The element of the antenna A2 is placed in the transparent area 11, having an interval of twice the first interval with respect to the horizontal wire 32T. The element E1 is placed in the transparent area 11, having an interval of quadruple the first interval with respect to the horizontal wire 32T, and is placed in the shading area 12, above and close to the element of the antenna A1. The element E2 is placed in the transparent area 11, having an interval of the first interval multiplied by unity with respect to the horizontal wire 32T, and is placed in the shading area 12, below and close to the element of the antenna A1. The elements E1 and E2 are connected to the same vertical wire 33, a part of which is common. Configured as in FIG. 14B, in the shading area 12, the elements of the antennas A1 and A2 and the elements E1 and E2 are placed close to each other, respectively. Therefore, it is possible to raise the antenna sensitivity of the antennas A1 and A2, respectively. Note that three or more elements E may be placed close to the elements of antennas A, respectively.

In the example in FIG. 14C, the elements E1 and E2 in the example in FIG. 14B are separated. Specifically, the elements E1 and E2 are connected to respective vertical wires 33 different from each other. Configured as in FIG. 14C, the elements E1 and E2 can be designed independently of each other.

Third Embodiment

A window glass for a vehicle according to a third embodiment will be described with reference to FIG. 15 and FIGS. 16A to 16E. In the embodiment, the no-power-fed element 9 will be described in detail. As described above, the no-power-fed element 9 includes the first overlapping part 91 and the second overlapping part 92.

The first overlapping part 91 is a part of the no-power-fed elements 9 that is placed in parallel with the horizontal wire 75 of the RKE antenna 7 separated by a third interval. Placing the part of the no-power-fed element 9 (the first overlapping part 91) in this way makes the no-power-fed element 9 capacitively coupled with the RKE antenna 7. The third interval can be designed discretionarily as long as the no-power-fed element 9 is capacitively coupled with the RKE antenna 7, favorably less than or equal to 5 mm. In the example in FIG. 2, the third interval is 2 mm.

The second overlapping part 92 is a part of the no-power-fed elements 9 that is placed in parallel with the horizontal wire 86 of the AM antenna 8 separated by a fourth interval. Placing the part of the no-power-fed element 9 (the second overlapping part 92) in this way makes the no-power-fed element 9 capacitively coupled with the AM antenna 8. The fourth interval can be designed discretionarily as long as the no-power-fed element 9 is capacitively coupled with the AM antenna 8, favorably less than or equal to 5 mm. In the example in FIG. 2, the fourth interval is 2 mm.

Next, effects of the window glass for a vehicle according to the embodiment will be described.

According to the embodiment, the no-power-fed element 9 is capacitively coupled with the RKE antenna 7, and the no-power-fed element 9 is capacitively coupled with the AM antenna 8. In other words, the RKE antenna 7 and the AM antenna 8 are electrically (indirectly) coupled with each other through the no-power-fed element 9.

Consequently, a resonating point is formed in the RKE antenna 7, depending on the shape of the RKE antenna 7, the shape of the AM antenna 8, the length of the first overlapping part 91, the length of the second overlapping part 92, the third interval, and the fourth interval. Therefore, by adjusting the above parameters so that the resonating point falls on a predetermined frequency, it is possible to make the reception frequency of the RKE antenna 7 coincide with the predetermined frequency. Although the predetermined frequency includes, for example, 314 MHz, 434 MHz, 868 MHz, and the like, it is not limited as such. The parameters may be adjusted with an experiment.

Figure 15:
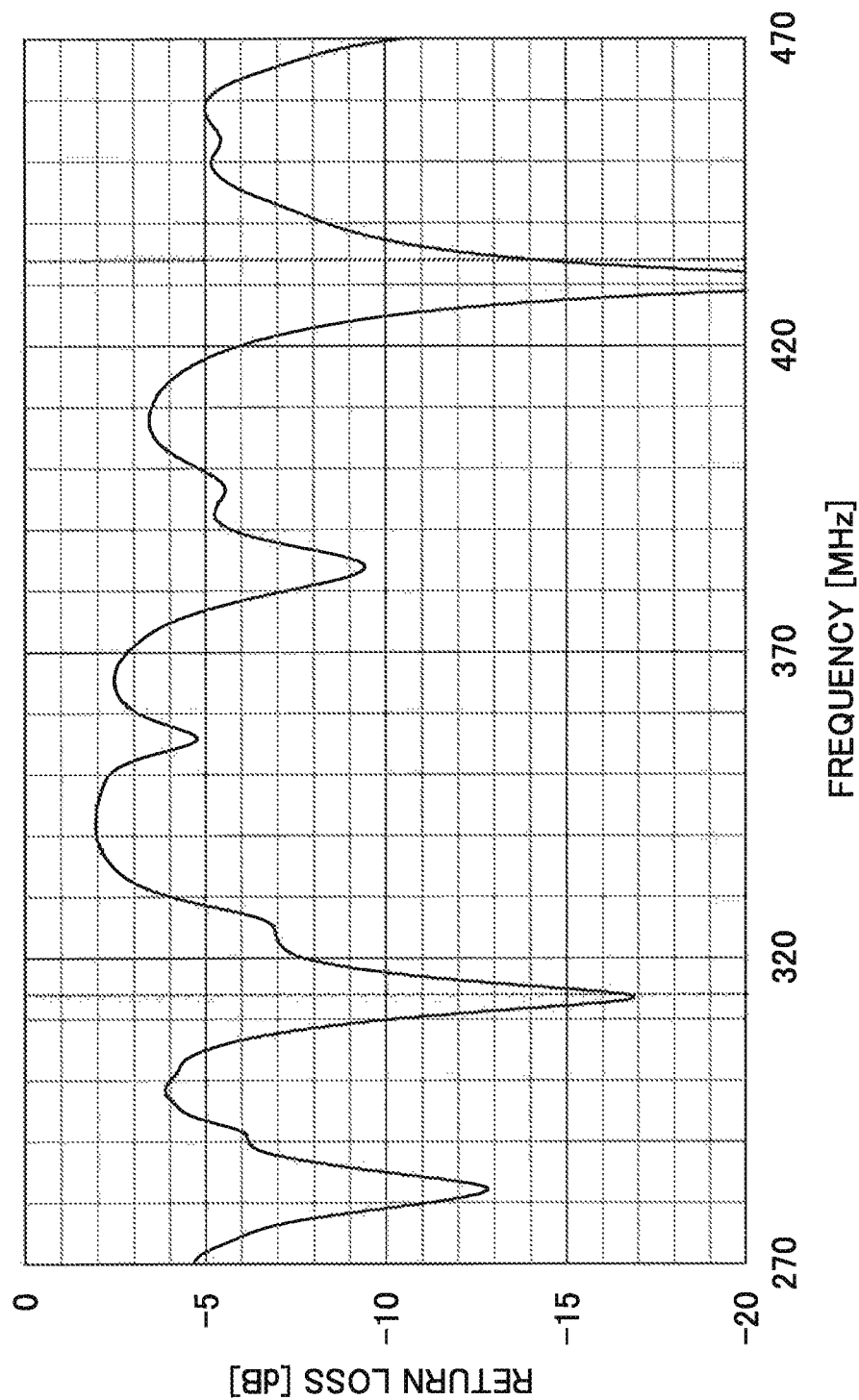
FIG. 15 is a graph illustrating an experimental result of return loss of the RKE antenna in FIG. 2.

FIG. 15 is a graph illustrating an experimental result of return loss of the RKE antenna in FIG. 2. As illustrated in FIG. 15, the configuration in FIG. 2 causes the reception frequencies of the RKE antenna 7 to be 314 MHz and 434 MHz.

As described above, according to the embodiment, providing the no-power-fed element 9 enables to set multiple reception frequencies to be received by the RKE antenna 7. Reception frequencies to be received by the RKE antenna 7 can be set discretionarily by adjusting the shape of the RKE antenna 7, the shape of the AM antenna 8, the length of the first overlapping part 91, the length of the second overlapping part 92, the third interval, and the fourth interval.

If multiple reception frequencies to be received by the RKE antenna 7 are set only depending on the shape of the RKE antenna 7, it is necessary to lengthen wires of the RKE antenna 7 and/or to increase the number of wires, and consequently, the area occupied by the RKE antenna 7 becomes larger. In contrast, in the embodiment, it is possible to set multiple reception frequencies by adjusting the length of the first overlapping part 91, the length of the second overlapping part 92, the third interval, and the fourth interval. Therefore, according to the embodiment, it is possible to make the RKE antenna 7 including multiple reception frequencies smaller.

Also, in the embodiment, since the AM antenna 8 that is capacitively coupled through the no-power-fed element 9 is used for transmission and reception of an RKE signal, it is possible to raise the transmission and reception performance of the RKE antenna 7.

Also, according to the embodiment, it is possible to adjust the reception frequencies of the RKE antenna 7 without changing the shapes of the RKE antenna 7 and the AM antenna 8. Therefore, it is possible to easily adjust the reception frequencies of the RKE antenna 7.

Also, according to the embodiment, adjusting the third interval and the fourth interval, respectively, enables to independently adjust the strength of the capacitive coupling of the no-power-fed element 9 and the RKE antenna 7, and the strength of the capacitive coupling of the no-power-fed element 9 and the AM antenna 8. Thereby, it is possible to adjust the reception frequencies of the RKE antenna 7 more freely.

Also, in the embodiment, two antennas that are capacitively coupled through the no-power-fed element 9 are not limited to the RKE antenna 7 and the AM antenna 8. For example, the two antennas may be the RKE antenna 7 and the FM/DAB antenna 6. However, it is favorable that the two antennas have respective reception frequencies that are separated (e.g., 10 times or greater) as in the case of the RKE antenna 7 and the AM antenna 8. This is because if the reception frequencies of two antennas are close to each other, the receiving sensitivity of the antennas may decline by interference.

Hereinafter, among two antennas that are capacitively coupled through the no-power-fed element 9, an antenna having a higher reception frequency will be referred to as an "antenna H", and the other antenna having a lower reception frequency will be referred to as an "antenna L". In the example in FIG. 2, the antenna H corresponds to the RKE antenna 7, and the antenna L corresponds to the AM antenna 8.

FIGS. 16A to 16E are diagrams schematically illustrating variations of glass antennas according to the embodiment.

Figure 16A:
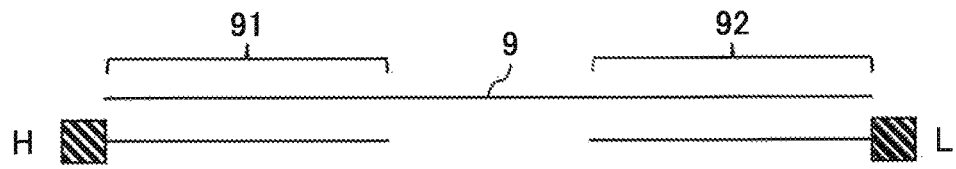
FIG. 16A to 16E are diagrams schematically illustrating variations of glass antennas according to a third embodiment.

In the example in FIG. 16A, the elements of the antenna H and the antenna L are placed on the same imaginary line, and the no-power-fed element 9 is a single wire. The first overlapping part 91 is placed in parallel with and separated from the entirety of the element of the antenna H by the third interval. The second overlapping part 92 is placed in parallel with and separated from the entirety of the element of the antenna L by the fourth interval. In the example in FIG. 16A, the third interval is equal to the fourth interval; the length of the first overlapping part 91 is equal to the length of the element of the antenna H; and the length of the second overlapping part 92 is equal to the length of the element of the antenna L.

Figure 16B:
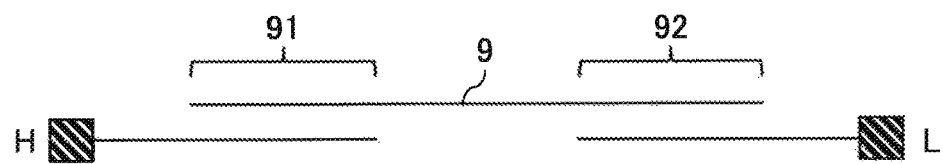

In the example in FIG. 16B, the elements of the antenna H and the antenna L are placed on the same imaginary line, and the no-power-fed element 9 is a single wire. The first overlapping part 91 is placed in parallel with and separated from a part of the element of the antenna H by the third interval. The second overlapping part 92 is placed in parallel with and separated from a part of the element of the antenna L by the fourth interval. The example in FIG. 16B corresponds to the glass antenna 5 in FIG. 2. In the example in FIG. 16B, the third interval is equal to the fourth interval.

Figure 16C:
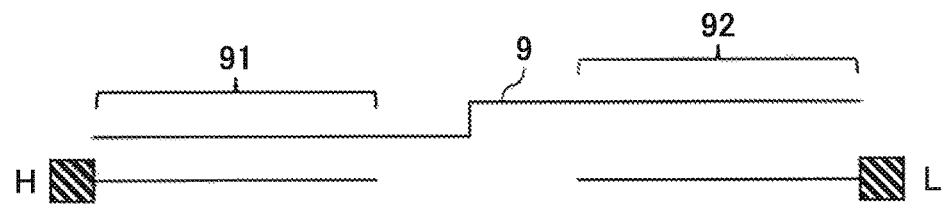

In the example in FIG. 16C, the elements of the antenna H and the antenna L are placed on the same imaginary line. Also, the no-power-fed element 9 is constituted with two horizontal wires that are placed to be vertically shifted from each other, and a vertical wire that connects the two horizontal wires. In the example in FIG. 16C, the third interval is different from the fourth interval.

Figure 16D:
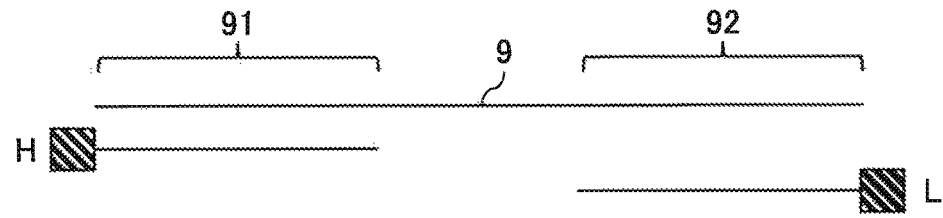

In the example in FIG. 16D, the elements of the antenna H and the antenna L are placed to be vertically shifted from each other, and the no-power-fed element 9 is a single wire. In the example in FIG. 16D, the third interval is different from the fourth interval.

Figure 16E:
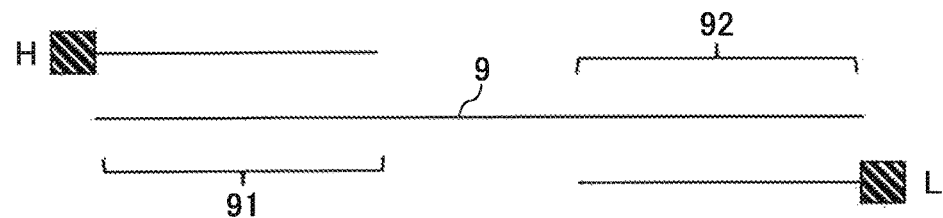

In the example in FIG. 16E, the elements of the antenna H and the antenna L are placed to be vertically shifted from each other, and the no-power-fed element 9 is a single wire. However, unlike in FIG. 16D, the no-power-fed element 9 is placed between the antenna H and the antenna L. In the example in FIG. 16E, it is possible to adjust the third interval and the fourth interval by adjusting the arrangement of the no-power-fed element 9.

In any of the cases in FIGS. 16A to 16E, since the antenna H and the antenna L are electrically coupled through the no-power-fed element 9, it is possible to obtain the above effect of making the antennas H and L that include multiple reception frequencies smaller.

Note that the present invention is not limited to configurations described here, such that elements described in the above embodiments may be combined with the other elements. In this regard, changes may be made as long as not deviating from the scope of the present invention, and may be defined appropriately depending on an application form.

The invention claimed is:

1. A window glass for a vehicle, comprising:
the window glass that includes a transparent area and a shading area provided around the transparent area;
a defogger that includes a plurality of first wires placed at equal intervals each being a first interval and extended in a first direction, and a defogger element connected to the first wires; and
a glass antenna that includes a first power feeding point provided in the shading area, and a first element connected to the first power feeding point,
wherein the defogger element includes a first part that is provided in the transparent area and is extended in the first direction, and a second part that is provided in the shading area and is connected to the first part,
wherein the first element includes a third part that is provided in the transparent area and is extended in the first direction, and a fourth part that is provided in the shading area and is connected to the third part and the first power feeding point,
wherein the fourth part forms a first bending part including a first vertical wire and a first horizontal wire,
wherein the second part forms a second bending part placed along the first bending part, and including a second vertical wire and a second horizontal wire,
wherein a part of the first vertical wire and the second vertical wire, and a part of the first horizontal wire and the second horizontal wire, are placed at a second interval narrower than the first interval, and
wherein the fourth part forms the first bending part with the first vertical wire and the first horizontal wire, and forms another first bending part with the first vertical wire and another first horizontal wire, and
wherein the second part forms the second bending part placed along the first bending part, with the second vertical wire and the second horizontal wire, and forms another second bending part placed along said another first bending part, with the second vertical wire and another second horizontal wire.

2. The window glass for the vehicle as claimed in claim 1, wherein at least one of the first part and the third part is placed at an interval being an integral multiple of the first interval, with respect to the first wires.

3. The window glass for the vehicle as claimed in claim 1, wherein the second bending part is formed by a multifold wire or is formed by a thick wire.

4. The window glass for the vehicle as claimed in claim 1, wherein the first part is placed between the third part and the first wire.

5. The window glass for the vehicle as claimed in claim 1, wherein the third part is placed between the first part and the first wire.

6. The window glass for the vehicle as claimed in claim 1, wherein the part of the second part and the part of the fourth part are placed in parallel, having an interval of 5 mm or less.

7. The window glass for the vehicle as claimed in claim 1, wherein the defogger element includes a second wire extended in a second direction to connect the first wire and the first part.

8. The window glass for the vehicle as claimed in claim 1, wherein the defogger includes a plurality of the defogger elements.

9. The window glass for the vehicle as claimed in claim 1, wherein the glass antenna further includes
a second antenna that includes a second power feeding point placed next to the first power feeding point, and a second element connected to the second power feeding point,
a third antenna that includes a third power feeding point placed next to the second power feeding point, and a third element that is connected to the third power feeding point and has a longest path longer than respective longest paths of the first element and the second element, wherein at least a part of the third element is placed between the first element and the second element.

10. The window glass for the vehicle as claimed in claim 1, wherein the glass antenna further includes
a second antenna that includes a second power feeding point, and a second element connected to the second power feeding point, a third antenna that includes a third power feeding point, and a third element that is connected to the third power feeding point, and a no-power-fed element that includes a first overlapping part placed in parallel with at least a part of the second element, separated by a third interval, and a second overlapping part placed in parallel with at least a part of the third element, separated by a fourth interval.

11. The window glass for the vehicle as claimed in claim 1, wherein the second interval is less than or equal to 5 millimeters (mm).

* * * * *